United States Patent
Wang

(10) Patent No.: US 10,271,351 B1
(45) Date of Patent: Apr. 23, 2019

(54) USER EQUIPMENT GRANT PROCEDURE FOR UPLINK CARRIER AGGREGATION

(71) Applicant: Google LLC, Mountain View, CA (US)

(72) Inventor: Jibing Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/826,381

(22) Filed: Nov. 29, 2017

(51) Int. Cl.
H04W 74/08 (2009.01)
H04W 16/28 (2009.01)
H04W 72/04 (2009.01)
H04W 72/12 (2009.01)
H04W 72/14 (2009.01)
H04W 72/08 (2009.01)
H04W 16/14 (2009.01)

(52) U.S. Cl.
CPC .......... *H04W 72/14* (2013.01); *H04W 16/14* (2013.01); *H04W 72/082* (2013.01); *H04W 72/1284* (2013.01)

(58) Field of Classification Search
CPC combination set(s) only.
See application file for complete search history.

(56) References Cited

U.S. PATENT DOCUMENTS

| | | |
|---|---|---|
| 8,873,480 B2 | 10/2014 | Ahmadi |
| 9,131,363 B2 | 9/2015 | Vujcic |
| 9,775,050 B1 | 9/2017 | Wang et al. |
| 2011/0080882 A1* | 4/2011 | Shu ........................ H04W 72/00 |
| 2013/0148535 A1 | 6/2013 | Baghel et al. |
| 2014/0313993 A1 | 10/2014 | Tabet et al. |

FOREIGN PATENT DOCUMENTS

| | | |
|---|---|---|
| WO | WO-2016119851 A1 | 8/2016 |
| WO | 2016195751 A1 | 12/2016 |

OTHER PUBLICATIONS

Palola Marko et al. "The first end-to-end live trial of CBRS with carrier aggregation using 3.5 GHz LTE equipment", pp. 1-2, Mar. 6, 2017.
International Search Report and the Written Opinion for the related application PCT/US2018/045599 dated Oct. 17, 2018.

* cited by examiner

*Primary Examiner* — Ronald B Abelson
(74) *Attorney, Agent, or Firm* — Honigman Miller Schwartz and Cohn LLP

(57) ABSTRACT

A method includes receiving a grant request message over a first uplink channel from a user equipment (UE) device requesting permission to operate on a second uplink channel within a Citizens Broadband Radio Services (CBRS) spectrum band. The UE device supports carrier aggregation of the first and second uplink channels. The method also includes determining whether operating the UE device on the second uplink channel at the corresponding maximum transmit power will cause impermissible interference within the CBRS spectrum band. When operating the UE device on the second uplink channel at the maximum transmit power will not cause impermissible interference, the method includes granting permission for the UE device to operate on the second uplink channel at the maximum transmit power.

28 Claims, 13 Drawing Sheets

| | | | | 310 → CBRS Spectrum 3570-3580 MHz | | 350,350a-c | |
|---|---|---|---|---|---|---|---|
| 306 → 320 → 330 → | | | 340 → TX Power (dBm) | Antenna Orientation | Antenna Tilt (degrees) | Antenna Height (m) |
| Device ID | Tier | Location | | | | | |
| 1 | Tier 1 | 42.3314° N, 83.0458° W | 41.50 | 60 | -10 | 15 |
| 2 | Tier 2 | 43.7363° N, 83.9681° W | 35.23 | 120 | 0 | 2 |
| ... | ... | ... | ... | ... | ... | ... |
| N | Tier 2 | 42.6819° N, 81.9677° W | 42.40 | 80 | 10 | 10 |

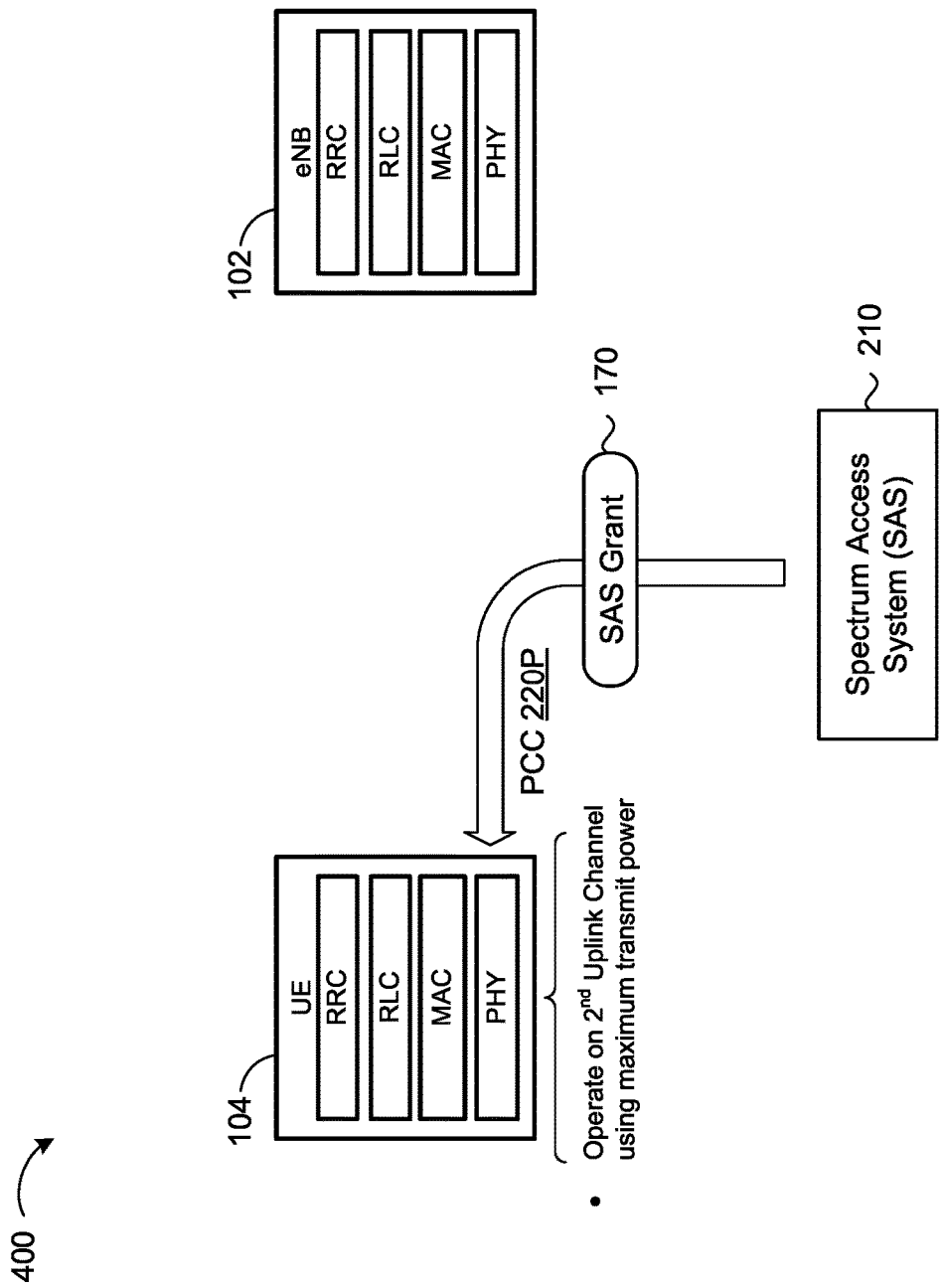

USER EQUIPMENT GRANT PROCEDURE FOR UPLINK CARRIER AGGREGATION

TECHNICAL FIELD

This disclosure relates to a grant procedure between user equipment and a spectrum allocation system for uplink carrier aggregation.

BACKGROUND

Long-Term Evolution (LTE) is a standard for wireless communication of high-speed data for mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different ratio interfaces in addition to core network improvements. LTE supports scalable carrier bandwidths, from 1.4 MHz to 20 MHz and supports both frequency division duplexing (FDD) and time-division duplexing (TDD).

In LTE networks, a wireless User Equipment (UE) can be allocated a traffic channel and a signaling channel by an evolved Node B (eNB) for exchanging signaling and communications with the eNB. Carrier aggregation allows the eNB to allocate multiple component carriers (CCs) jointly for use by the UE in exchanging higher rate communications with the eNB. Carrier aggregation generally defines a number of servicing cells, one for each component carrier. A UE may apply for a grant from a spectrum allocation system (SAS) to operate at multiple uplink (UL) channels for uplink CA over the shared 3.5 GHz spectrum, known as the Citizens Broadband Radio System (CBRS). The SAS is responsible for provisioning the shared 3.5 GHz spectrum to equipment providers in a way that protects incumbents. Without enacting the SAS grant procedure, a UE will not be able to operate with uplink CA at high transmit powers, thereby limiting uplink throughputs and range by the UE.

SUMMARY

One aspect of the disclosure provides a method for granting permission by a spectrum access system (SAS) for a user equipment (UE) device to operate on a second uplink channel when a grant request message is received from the UE device over a first uplink channel. The method includes receiving, at data processing hardware of the SAS, a grant request message over the first uplink channel from the UE device requesting permission to operate on a second uplink channel within a Citizens Broadband Radio Services (CBRS) spectrum band. The grant request includes a current location and maximum transmit power of the UE device, the UE device supporting carrier aggregation of the first uplink channel and the second uplink channel. The method also includes determining, by the data processing hardware, whether operating the UE device on the second uplink channel at the corresponding maximum transmit power will cause impermissible interference within the CBRS spectrum band. When operating the UE device on the second uplink channel at the maximum transmit power will not cause impermissible interference, the method includes granting, by the data processing hardware, permission for the UE device to operate on the second uplink channel at the corresponding transmit power.

Implementations of the disclosure may include one or more of the following optional features. In some implementations, the UE device is configured to transmit the grant request message over the first uplink channel in response to receiving a radio resource control message from a serving base station, the radio resource control message instructing the UE device to add the second uplink channel. Optionally, the UE device may be configured to transmit the grant request message over the first uplink channel in response to receiving an activation message from a serving base station via medium access control (MAC) elements, the activation message instructing the UE device to activate the second uplink channel.

In some examples, the method includes receiving, at the data processing hardware, a grant relinquish message over the first uplink channel from the UE device, the grant relinquish message requesting removal of the grant for permission to operate on the second uplink channel. In this example, the UE device may be configured to transmit the grant relinquish message over the first uplink channel in response to receiving a radio resource control message from a serving base station, the radio resource control message instructing the UE device to remove the second uplink channel. Additionally or alternatively, the UE device may be configured to transmit the grant relinquish message over the first uplink channel in response to receiving a deactivation message from a serving base station via medium access control (MAC) elements, the deactivation message instructing the UE device to deactivate the second uplink channel.

In some configurations, determining whether operating the UE device on the second uplink channel will cause impermissible interference within the CBRS spectrum band includes: querying a SAS data source to identify incumbent transmission equipment registered with the SAS for operation within frequencies that include the second uplink channel. The data source includes a mapping of incumbent transmission equipment registered with the SAS to corresponding coverage areas. In this configuration, for each identified incumbent transmission equipment, the method includes estimating an interference level within the corresponding coverage area based on operation of the UE device on the second uplink channel at the corresponding maximum transmit power from the current location. Here, when the estimated interference level within at least one of the coverage areas satisfies an interference threshold, the method includes determining operation by the UE device on the second uplink channel at the maximum transmit power causes impermissible interference.

In some examples, the first uplink channel includes a primary component carrier and the second uplink channel includes a secondary component carrier. Optionally, the maximum transmit power of the UE device may include an effective isotropic radiated power (EIRP) value greater than 23 decibels-milliwatt (dBm).

Another aspect of the disclosure provides a spectrum access system (SAS) including data processing hardware and memory hardware in communication with the data processing hardware. The memory hardware stores instructions that when executed on the data processing hardware cause the data processing hardware to perform operations. The operations include receiving a grant request message over a first uplink channel from a user equipment (UE) device requesting permission to operate on a second uplink channel within a Citizens Broadband Radio Services (CBRS) spectrum band. The grant request message includes a current location and maximum transmit power of the UE device, the UE device supporting carrier aggregation of the first uplink channel and the second uplink channel. The operations also include determining whether operating the UE device on the second uplink channel at the corresponding maximum transmit power will cause impermissible interference within the CBRS spectrum band. When operating the UE device on the second uplink channel at the maximum transmit power will not cause impermissible interference, the operations include granting, by the data processing hardware, permission for the UE device to operate on the second uplink channel at the corresponding transmit power.

Implementations of the disclosure may include one or more of the following optional features. In some implementations of the system, the UE device is configured to transmit the grant request message over the first uplink channel in response to receiving a radio resource control message from a serving base station, the radio resource control message instructing the UE device to add the second uplink channel. In another configuration, the UE device is configured to transmit the grant request message over the first uplink channel in response to receiving an activation message from a serving base station via medium access control (MAC) elements, the activation message instructing the UE device to activate the second uplink channel.

In some configurations, the operations include receiving a grant relinquish message over the first uplink channel from the UE device, the grant relinquish message requesting removal of the grant for permission to operate on the second uplink channel. In some scenarios, the UE device may be configured to transmit the grant relinquish message over the first uplink channel in response to receiving a radio resource control message from a serving base station, the radio resource control message instructing the UE device to remove the second uplink channel. Optionally, the UE device may also be configured to transmit the grant relinquish message over the first uplink channel in response to receiving a deactivation message from a serving base station via medium access control (MAC) elements, the deactivation message instructing the UE device to deactivate the second uplink channel.

In some examples, when determining whether operating the UE device on the second uplink channel will cause impermissible interference within the CBRS spectrum band the system includes querying a SAS data source to identify incumbent transmission equipment registered with the SAS for operation within frequencies that include the second uplink channel. The SAS data source includes a mapping of incumbent transmission equipment registered with the SAS to corresponding coverage areas. In this example, for each identified incumbent transmission equipment, the system includes estimating an interference level within the corresponding coverage area based on operation of the UE device on the second uplink channel at the corresponding maximum transmit power from the current location. Here, when the estimated interference level within at least one of the coverage areas satisfies an interference threshold, the system includes determining operation by the UE device on the second uplink channel at the maximum transmit power causes impermissible interference.

In some configurations of the SAS, the first uplink channel includes a primary component carrier and the second uplink channel includes a secondary component carrier. The maximum transmit power of the UE device may include an effective isotropic radiated power (EIRP) value greater than 23 decibels-milliwatt (dBm).

Yet another aspect of the disclosure provides a method of using a primary component carrier (CC) to apply for a grant from a spectrum access system (SAS) for permission to operate on a secondary CC. The method includes receiving, at data processing hardware of the UE device, a configuration message over the primary CC from a serving base station. The configuration message commands the UE device to add or activate a secondary CC within a Citizens Broadband Radio Services (CBRS) spectrum band. The UE device supports carrier aggregation of the primary CC and the secondary CC for uplink communications. The method also includes, in response to receiving the configuration message, transmitting a grant request message over the primary CC from the UE device to the SAS. The grant request message requests permission from the SAS for the UE device to operate on the secondary CC at a maximum transmit power from a current location. The method further includes receiving, at the data processing hardware, one of a grant message or denial message from the SAS. The grant message grants the UE device permission to operate on the secondary CC at the maximum transmit power and the denial message denies the UE permission to operate on the secondary CC at the maximum transmit power. When the grant message is received, the method includes operating, by the data processing hardware, the UE device on the secondary CC at the maximum transmit power for uplink communications.

Implementations of the disclosure of the method for a user equipment may include one or more of the following optional features. In some examples, receiving the configuration message from the serving base station includes one of the following: receiving a radio resource control message commanding the UE device to add the secondary CC for uplink communications or receiving an activation message via medium access control (MAC) elements, the activation message commanding the UE device to activate the secondary CC for uplink communications.

In some configurations, in response to receiving the grant request message, the SAS is configured to: determine whether operating the UE device on the secondary CC at the maximum transmit power from the current location will cause impermissible interference within the CBRS spectrum band, and one of: transmit the grant message when operating the UE device on the secondary CC at the maximum transmit power from the current location will not cause impermissible interference; or transmit the denial message when operating the UE device on the secondary CC at the maximum transmit power from the current location will cause impermissible interference. In this configuration, the SAS may determine whether operating the UE device on the secondary CC at the maximum transmit power from the current location will cause impermissible interference within the CBRS spectrum band by querying a SAS data source stored in the memory hardware to identify incumbent transmission equipment registered with the SAS for operation within frequencies that include the secondary CC. Here, the SAS data source includes a mapping of incumbent transmission equipment registered with the SAS to corresponding coverage areas. For each identified incumbent transmission equipment, the method may include estimating an interference level within the corresponding coverage area based on operation of the UE device on the secondary CC at the maximum transmit power from the current location, and, when the estimated interference level within at least one of the coverage areas satisfies an interference threshold, determining operation by the UE device on the secondary CC at the maximum transmit power from the current location causes impermissible interference.

In some implementations, when the denial message is received from the SAS, the method includes transmitting a subsequent grant request message over the primary CC from the UE device to the SAS. Here, the subsequent grant request message requests permission from the SAS for the UE device to operate on the secondary CC at a reduced transmit power from the current location, the reduced transmit power being less than the maximum transmit power and including an effective isotropic radiated power (EIRP) value greater than 23 decibels-milliwatt (dBm). In another example, when the denial message is received from the SAS, the method includes operating, by the data processing hardware, the UE device on the secondary CC at an allowable transmit power less than the maximum transmit power, the allowable transmit power not requiring a grant from the SAS for uplink communications over the secondary CC and including an effective isotropic radiated power (EIRP) value less than or equal to 23 dBm.

An additional aspect of the disclosure provides a user equipment (UE) device. The UE device includes data processing hardware and memory hardware in communication with the data processing hardware. The memory hardware stores instructions that when executed on the data processing hardware cause the data processing hardware to perform operations. The operations include receiving a configuration message over a primary component carrier (CC) from a serving base station, the configuration message commanding the UE device to add or activate a secondary CC within a Citizens Broadband Radio Services (CBRS) spectrum band. The UE device supports carrier aggregation of the primary CC and the secondary CC for uplink communications. The operations also include, in response to receiving the configuration message, transmitting a grant request message over the primary CC from the UE device to a spectrum access system (SAS). The grant request message requests permission from the SAS for the UE device to operate on the secondary CC at a maximum transmit power from a current location. The operations further include receiving one of a grant message or denial message from the SAS. The grant message grants the UE permission to operate on the secondary CC at the maximum transmit power from the current location and the denial message denies the UE permission to operate on the secondary CC at the maximum transmit power from the current location. When the grant message is received, the operations include operating the UE device on the secondary CC at the maximum transmit power from the current location for uplink communications.

Implementations of the disclosure of the UE device may include one or more of the following optional features. In some examples, receiving the configuration message from the serving base station includes one of: receiving a radio resource control message commanding the UE device to add the secondary CC for uplink communications; or receiving an activation message via medium access control (MAC) elements, the activation message commanding the UE device to activate the secondary CC for uplink communications.

In some configurations, in response to receiving the grant request message, the SAS is configured to determine whether operating the UE device on the secondary CC at the maximum transmit power from the current location will cause impermissible interference within the CBRS spectrum band, and one of the following: transmit the grant message when operating the UE device on the secondary CC at the maximum transmit power from the current location will not cause impermissible interference; or transmit the denial message when operating the UE device on the secondary CC at the maximum transmit power from the current location will cause impermissible interference. In these configurations, the SAS may determine whether operating the UE device on the secondary CC at the maximum transmit power from the current location will cause impermissible interference within the CBRS spectrum band by querying a SAS data source stored in the memory hardware to identify incumbent transmission equipment registered with the SAS for operation within frequencies that include the secondary CC. Here, the SAS data source includes a mapping of incumbent transmission equipment registered with the SAS to corresponding coverage areas. For each identified incumbent transmission equipment, the method may include estimating an interference level within the corresponding coverage area based on operation of the UE device on the secondary CC at the maximum transmit power from the current location, and, when the estimated interference level within at least one of the coverage areas satisfies an interference threshold, determining operation by the UE device on the secondary CC at the maximum transmit power from the current location causes impermissible interference.

In some implementations, the operations include, when the denial message is received from the SAS, transmitting a subsequent grant request message over the primary CC from the UE device to the SAS. In these implementations, the subsequent grant request message requests permission from the SAS for the UE device to operate on the secondary CC at a reduced transmit power, the reduced transmit power less than the maximum transmit power and including an effective isotropic radiated power (EIRP) value greater than 23 decibels-milliwatt (dBm). Optionally, the operations may include operating the UE device on the secondary CC at an allowable transmit power less than the maximum transmit power when the UE device receives the denial message from the SAS. Use of allowable transmit power for uplink transmission by the UE device does not require a grant from the SAS for uplink communications over the secondary CC because the allowable transmit power includes an effective isotropic radiated power (EIRP) value less than or equal to 23 decibels-milliwatt (dBm).

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view including an example mapping of incumbent transmission equipment registered with the SAS to corresponding coverage areas.

FIGS. 5A-5D are schematic views of an example network environment showing a UE device using a primary CC to apply for a grant for uplink carrier aggregation of a secondary CC when UE device receives a configuration message from a serving base station that commands the UE device to activate the secondary CC.

Like reference symbols in the various drawings indicate like elements.

DETAILED DESCRIPTION

Figure 1:
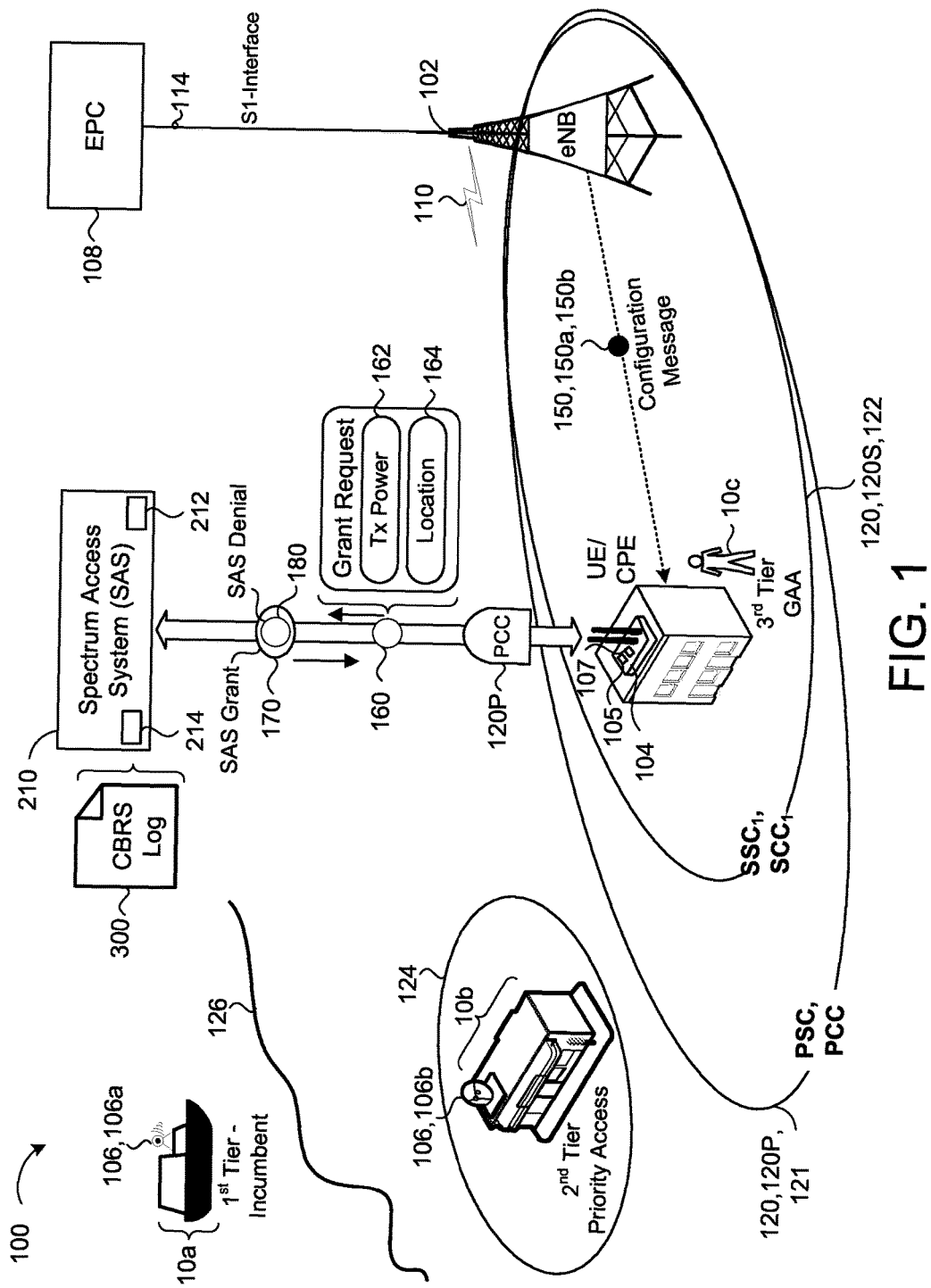
FIG. 1 is a schematic view of an example network.

The Federal Communications Committee (FCC) has adopted an advanced three-tier spectrum sharing framework for the new Citizens Broadband Radio System (CBRS) 3.5 Gigahertz (GHz) spectrum band. The three tiers of use are Incumbent (e.g., military radars), Priority Access License (PAL) (e.g., satellite earth stations), and General Authorized Access (GAA) (e.g., new commercial users). A Spectrum Access System (SAS) within the CBRS 3.5 GHz band functions as a highly automated radio spectrum coordinator tasked with protecting the higher-tier users from lower-tier users while optimizing dynamic sharing of the available 150 Megahertz (MHz) of CBRS spectrum band (3550 MHz to 3700 MHz) for all users. To achieve this task, the SAS maintains a data store of all CBRS communication devices (e.g., radios, base stations, transmitters, access points, etc.) that include their tier status, geographical location, operational parameters, and any other pertinent information to coordinate frequency and transmit power assignments, while simultaneously monitoring and protecting the CBRS spectrum band from potential interference.

The SAS has complete authoritative control over users of the shared spectrum resources to assure that the top tier incumbent users are always protected. The SAS further applies a series of sophisticated algorithms to ensure that FCC rules are enforced at all times by users of the shared spectrum resources, while giving maximum access to the available spectrum. For instance, the FCC rules specify that at least 80 MHz of spectrum will be available for GAA use when no Incumbent users are present, and in some scenarios, the full 150 MHz will be available if there are not Incumbents or Priority access users in an area. Accordingly, the SAS may apply real-time sensing and data source information to enforce the hierarchal spectrum sharing regulations and to determine spectrum availability for assigning spectrum to individual radios or networks of radios.

User equipment (UE) devices configured to operate over modern radio access technologies (RATs), such as Long-Term Evolution-Advanced (LTE-A), support carrier aggregation techniques in which communication between a UE device and a network can be conveyed over multiple component carriers (CCs) to increase available bandwidth for communication between the UE device and the network. For instance, a UE device may establish a connection with a serving base station on a primary CC (i.e., a first uplink channel) and the serving base station may initiate the UE device to operate in an uplink carrier aggregation mode by commanding the UE device to add or activate an uplink secondary CC (i.e., a second uplink channel).

Implementations herein are directed toward the serving base station initiating the UE device to operate in the carrier aggregation mode by commanding the UE device to add or activate an uplink secondary CC associated with a corresponding frequency within the unlicensed CBRS spectrum band. Implementations are further directed toward the UE device having a maximum transmit power that exceeds an end user device (EUD) allowable transmit power limit defined by the FCC and enforced by SAS. For instance, the EUD allowable transmit power limit may include an effective isotropic radiated power (EIRP) value equal 23 decibels-milliwatt (dBm) per 10 MHz (23 dBm/10 MHz). Accordingly, the UE device is required to apply for a SAS grant from the SAS to operate on the secondary CC at the maximum transmit power and must receive the SAS grant from the SAS before the UE device can send uplink communications on the secondary CC at the maximum transmit power. Without grant approval from the SAS, the UE device may operate on the secondary CC at a transmit power less than or equal to the EUD allowable transmit power limit or the UE device may apply for a new SAS grant for operation on a different secondary CC and/or a reduced transmit power. Described in greater detail below, the SAS may deny access (i.e., grant denial) when operating on the secondary CC at the maximum transmit power is expected to cause impermissible interference with higher-tier users operating in the same spectrum space or operation on the secondary CC is strictly prohibited due to an incumbent first-tier user in close proximity or interfering with a restricted area reserved for incumbent first-tier users.

While the EUD allowable transmit power defined by the FCC is currently set at 23 dBm/10 MHz, the FCC could set the EUD allowable transmit power to another value greater than or less than 23 dBm/10 MHz. Accordingly, implementations herein are directed toward the UE device applying for the SAS grant to operate on the secondary CC whenever the maximum transmit power exceeds the most up-to-date value of the EUD allowable transmit power limit as set by the FCC and enforced by the SAS.

FIG. 1 shows a Long-Term Evolution (LTE) network 100 that may operate in licensed frequency bands as well as unlicensed frequency bands, such as the Citizens Broadband Frequency Spectrum (CBRS) band within the range of 3550-3700 Megahertz. LTE is a standard for wireless communication of high-speed data between a base station 102 and a User Equipment (UE) device 104, such as a customer premises equipment (CPE) data terminal having a maximum transmission power that exceeds an end user device (EUD) allowable power limit defined by the FCC for use in the CBRS spectrum band. While the EUD allowable power limit is currently equal to 23 dBm/10 Mhz, the FCC may set the EUD allowable power limit to other values greater than or less than 23 dBm/10 MHz in the future. The UE device 104 includes data processing hardware 105 and memory hardware 107. Accordingly, the terms UE and CPE are used interchangeably in this disclosure. While only one base station 102 and only one UE device 104 are shown in the example, the network 100 may include multiple base stations 102 each servicing multiple UE devices 104. The term UE/CPE device 104 may be used to interchangeably with the terms UE/CPE, UE, UE device, CPE, and CPE device.

LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD). LTE-TDD networks 100 use a single frequency for uploading and downloading information. LTE-TDD networks 100 operate at frequencies ranging from 1450 MHz to 4300 MHz, with several different bands being used. On the other hand, LTE-FDD networks 100 refer to the transmitting device (e.g., base station 102 and the UE 104) transmitting and/or receiving upon different carrier frequencies. The base station 102 may communicate with an Evolved Packet Core (EPC) 108 that provides a framework configured to converge voice and data on the LTE network 100. The EPC 108 unifies voice and data on an Internet Protocol (IP) service architecture and voice is treated as just another IP application. The EPC 108 may include several key components that include, without limitations, a Mobility Management Entity (MME), a Serving Gateway (SGW), and a Packet Data Node Gateway (PGW).

Figure 2:
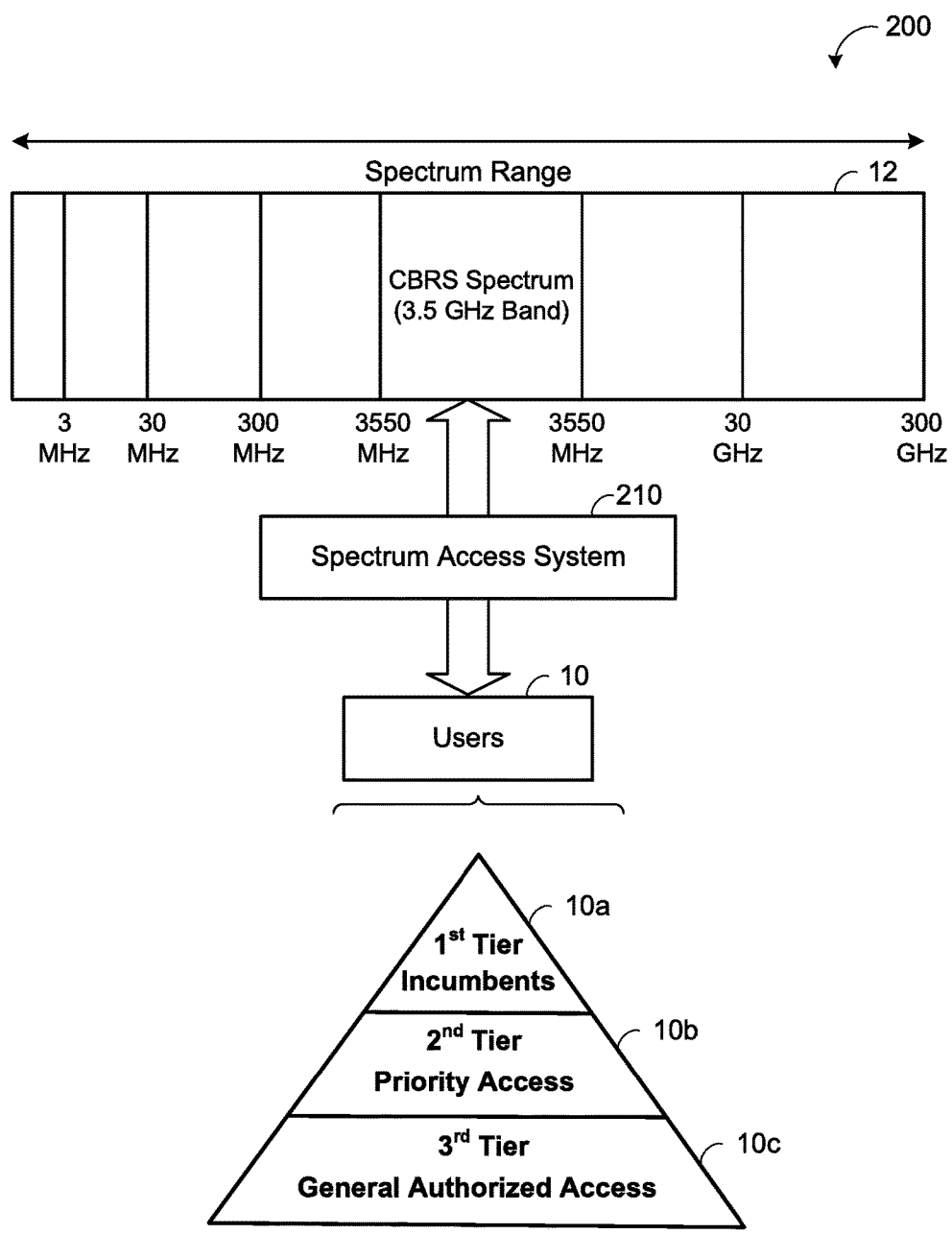
FIG. 2 is a schematic view of an example spectrum sharing framework including a spectrum access system (SAS) for managing access to an unlicensed Citizens Broadband Radio Service (CBRS) band.

A Spectrum Access System (SAS) 210 within the CBRS 3.5 GHz band is tasked with optimizing dynamic sharing of an available 150 Megahertz (MHz) among a three-tier framework that includes a $1^{st}$ tier of incumbent users 10a, a $2^{nd}$ tier of Priority Access License (PAL) users 10b, and a $3^{rd}$ tier of General Authorized Access (GAA) (e.g., new commercial users). In the example shown, the SAS 210 includes data processing hardware 212 and memory hardware 214 in communication with the data processing hardware 212. The memory hardware 214 may store instructions for executing the SAS 210 on the data processing hardware 212. FIG. 2 provides an example spectrum sharing framework 200 including the SAS 210 that manages access to and operation of the unlicensed CBRS band 12 by the three-tiers of users 10, 10a-c. The spectrum 12 occupies 150 MHz of available spectrum (3550 MHz to 3700 MHz) within the unlicensed CBRS 3.5 GHz band. The $1^{st}$ and highest tier of incumbent users 10a includes federal users and fixed satellite service ("FSS"). The $2^{nd}$ tier PAL users 10b have a license to use an unpaired 10 MHz channel in the 3440-3650 MHz range in a geographical coverage area 124 (FIG. 1) for a single three year period, whereby the geographical coverage areas 124 may include census tracts that align with the borders of political boundaries such as cities or counties. The $3^{rd}$ tier GAA users 10c are allowed access to 80 MHz of the 3.5 GHz band that is not assigned to a higher tier (i.e., the $1^{st}$ tier or $2^{nd}$ tier). GAA users 10c are licensed "by rule" in that entities that qualify to be FCC licensees may use FCC-authorized telecommunications equipment (e.g., CBRS transmission equipment) in the GAA band without having to obtain an individual spectrum license. The FCC requires that GAA users 10c employ CBRS transmission equipment that comports with applicable FCC rules by registering with, and receiving approval by, the SAS 210. The UE/CPE device 104 corresponds to CBRS transmission equipment The SAS 210 has complete authoritative control over all users 10 (e.g., operators) of the shared spectrum to assure that the top tier ($1^{st}$ tier) Incumbent users 10a are always protected from interference from both the $2^{nd}$ tier PAL users 10b and the $3^{rd}$ tier GAA users 10c, and that $2^{nd}$ tier PAL users 10b are always protected from interference from the $3^{rd}$ tier GAA users 10c. Thus, PAL users 10b must provide interference protection for $1^{st}$ tier Incumbent users 10a and accept interference from them, but are entitled to interference protection from $3^{rd}$ tier GAA users 10. The $3^{rd}$ tier GAA users 10c receive no interference protection from the $1^{st}$ tier incumbent users/operators 10a or the $2^{nd}$ tier PAL users/operators 10b and must accept interference from both of them. The SAS 210 has the authority to enforce rules and regulations set forth by the FCC, and therefore, the SAS 210 must follow protocols to comply with enforcement instructions from the FCC. Accordingly, the SAS 210 functions as the "first line of recourse" for resolving issues, especially interference disputes that could arise regarding use of the CBRS band 12. The FCC, however, retains ultimate enforcement authority when the SAS 210 cannot resolve issues among CBRS users 10, in matters of interference, unauthorized frequency, and equipment use.

The station 102 may include an evolved Node B (also referred as eNode B or eNB). An eNB 102 includes hardware that connects to an air interface 110 (e.g., a mobile phone network) for communicating directly with the UE 104. For instance, the eNB 102 may transmit downlink LTE signals (e.g., communications) to the UE 104 and receive uplink LTE signals from the UE 104 over the air interface 110. The eNB 102 does not have a separate controller element and, thus, simplifies the architecture of the network 100. In addition, the eNB 102 embeds its own control functionality, since the eNB 102 does not include a separate controller element. The eNB 102 uses multiple protocols when interfacing with different elements. For example, the eNB 102 uses an S1 interface 114 for communicating with the EPC 108. The S1 interface 114 may include an S1-MME interface for communicating with the MME and an S1-U interface for interfacing with the SGW. Accordingly, the S1 interface 114 is associated with a backhaul link for communicating with the EPC 108.

In some examples, the network 100 includes a carrier aggregation-capable network supporting carrier aggregation where multiple component carriers (CCs) 120 are aggregated and jointly used for transmission to/from a single device (e.g., UE 104). The network 100 may include an LTE-Advanced network under Release 10 (LTE Rel-10) providing higher bitrates while still fulfilling requirements set by existing 4G networks. Under LTE Rel-10, a CC 120 may have a bandwidth of 1.4, 3, 5, 10 or 20 MHz and a maximum of five CCs 120 may be aggregated to provide a maximum aggregated bandwidth equal to 100 MHz. Future releases, such as LTE Release 13 (LTE Rel-13), may support up to a maximum of thirty-two (32) CCs 120. In FDD-networks 100, the number of aggregated carriers may be different for downlink (DL) communications and uplink (UL) communications. However, the number of UL CCs 120 is always equal to or less than the number of DL CCs 120 and individual CCs 120 can also be of different bandwidths. In TDD-networks 100, the number of CCs 120 as well as the bandwidths of each CC 120 are normally the same for DL and UL communications.

The easiest way to arrange aggregation is through contiguous CCs with the same frequency band, referred to as intra-band contiguous carrier aggregation. However, due to multiple different operator frequency allocation scenarios, intra-band continuous carrier aggregation may not always be possible. Accordingly, non-contiguous allocation may be arranged for one of intra-band or inter-band. Under intra-band non-continuous, the aggregated CCs 120 belong to the same frequency band, but include a gap or gaps in between. Under inter-band non-continuous aggregation, the aggregated CCs 120 belong to different operating frequency bands.

With continued reference to FIG. 1, a number of serving cells 121, 122 are each associated with a corresponding CC 120. The coverage for each serving cell 121, 122 may different due to the CCs 120 on different frequency bands experiencing different pathloss from each other. A Primary CC (PCC) 120P (i.e., DL PCC and UL PCC) serves a Primary serving cell (PSC) 121 configured to handle functionalities of Radio Resource Control (RRC) connection between an eNB 102 and a UE 104, as well as transfer of data between the eNB 102 and the UE 104. The UE 104 may also receive non-access stratum (NAS) information, such as security parameters, on the DL PCC 120P. FIG. 1 also shows a Secondary CC (SCC) 120S serving a corresponding Secondary serving cell (SSC) 122 configured to transfer of data between the eNB 102 and the UE 104. The SCCs 220S may be added and removed depending upon current bandwidth needs of the network 100, while the PCC 220P may change at handover.

In some implementations, the UE/CPE 104 is associated with a $3^{rd}$ tier GAA user/operator 10c and is configured to support uplink carrier aggregation of two or more CCs for communications within the CBRS band 12. For instance, the UE/CPE 104 may be deployed upon a rooftop of an office or home to provide a broadband wireless service. End user devices (EUDs), such as UEs/CPEs 104, do not require authorization by the SAS 210 for operating on a CC 220 associated with a frequency in the CBRS band so long as their transmission power does not exceed an EUD allowable transmit power limit defined by the FCC and enforced by SAS 210. In some examples, the EUD allowable transmit power limit includes an effective isotropic radiated power (EIRP) value equal to 23 dBm/10 MHz. However, when the UE/CPE 104 is capable of transmitting at powers greater than the EUD allowable transmit power limit, the UE/CPE 104 must apply for and receive a grant from the SAS 210 for permission to operate on the CC 220 such higher transmit powers. It is desirable for the UE/CPE 104 to operate at higher transmit powers to increase throughput and network speeds. Thus, the SAS 210 must ensure that operation by the UE/CPE 104 on the given CC 120 at the higher transmit power will not cause impermissible interference within the CBRS band, i.e., will not interfere with higher-tier users 10 such as $1^{st}$ tier incumbent users 10a and $2^{nd}$ tier PAL users 10b. In the example shown, a $1^{st}$ tier incumbent user 10a includes a government vessel operating off a coastline 126 and having corresponding transmission equipment 106, 106a (e.g., military radar) operating at a frequency within the CBRS band. Likewise, a $2^{nd}$ tier PAL user 10b includes a licensee with having associated transmission equipment 106, 106b mounted at a municipal building and operating at a frequency within the CBRS band to provide broadband wireless within geographical coverage area 124. The transmission equipment 106b associated with the PAL user 10b includes a fixed station or network of stations approved by the FCC and SAS 210 for transmitting at frequencies within the CBRS band at a given transmit power. As used herein, the transmission equipment 106a associated with the incumbent users 10a and the transmission equipment 106b associated with the PAL users 10b may be collectively referred to as "incumbent transmission equipment 106" with respect to the UE/CPE 104 since both the $1^{st}$ tier and $2^{nd}$ tier users 10a, 10b are always protected from interference by the $3^{rd}$ tier GAA users 10c. Implementations disclosed herein are directed toward the UE/CPE 104 having a maximum transmit power 162 that exceeds the EUD allowable transmit power limit, thereby requiring the GAA user 10c associated with the UE/CPE 104 to apply for a grant from the SAS 210 for uplink carrier aggregation within the CBRS band.

In the example shown, the UE/CPE 104 has an active connection with the eNB 102 over the primary CC 120P serving the corresponding PSC 121. The primary CC 120P may have an associated frequency within the CBRS band or outside the CBRS band (e.g., licensed or unlicensed). If the primary CC 120P is within the CBRS band, it will be assumed that the SAS 210 has granted permission for the eNB 102 and the UE/CPE 104 to operate over the primary CC 120P. While the eNB 102 may communicate with the SAS 210 via a wireline connection, the UE/CPE 104 is only capable of communicating with the SAS 210 via the primary CC 120P.

When operation by the UE/CPE 104 in an uplink carrier aggregation (CA) mode is possible/suitable, the eNB 102 may initiate operation by the UE/CPE 104 in the CA mode by sending a configuration message 150 to the UE/CPE 104. For instance, the eNB 102 may elect to initiate the CA mode for the UE/CPE 104 when a communication load in the UE/CPE 104 is high and/or when a traffic level at the eNB 102 is low. In the example shown, the configuration message 150 commands the UE/CPE 104 to add or activate the secondary CC 120S within the CBRS band for uplink communications. Accordingly, the secondary CC 120S may correspond to a second uplink channel having an associated frequency within the CBRS band. In some examples, the configuration message 150 includes a radio resource control (RRC) message 150a that commands the UE/CPE 104 to add the secondary CC 120S. In other examples, the configuration message 150 includes an activation message 150b sent via medium access control (MAC) elements (e.g., MAC layer) that commands the UE/CPE to activate the secondary CC 120S. The activation message 150b to activate the secondary CC 120S may follow a preceding RRC message 150 to add the corresponding secondary CC 120S.

In response to receiving the configuration message 150 from the eNB 102, the UE/CPE 104 uses the primary CC 120P, i.e., first uplink channel, to serve as an anchor point for transmitting a grant request message 160 to the SAS 210. Without this first uplink channel (primary CC 120P) to serve as the anchor point for transmitting the request message 160, the UE/CPE 104 would have no way of communicating with the SAS 210 to apply for the grant, and thus, would be limited to operating on the secondary CC 220S at transmit powers equal to or less than the EUD allowable transmit power limit The grant request message 160 requests the SAS 210 for permission to operate on the secondary CC 120S at a maximum transmit power 162 from a current location 164 of the UE/CPE 104. Accordingly, the grant request message 160 includes at least the maximum transmit power 162 and the current location 164 of the UE/CPE device 104. The grant request message 160 may function as a registration of the UE/CPE device 104 with the SAS 210, whereby the SAS 210 stores/records all pertinent information associated with the UE/CPE device 104 within a CBRS log 300 (e.g., data source) stored on the memory hardware 214. When registering with the SAS 210, the UE/CPE device 104 may provide pertinent information including, without limitations, an identifier, tier-status (e.g., Tier 3), the maximum transmit power 162, the current location 164, antenna orientation, antenna tilt, or antenna height.

The SAS 210 determines whether operating the UE/CPE 104 on the secondary CC 120S (i.e., second uplink channel) at the maximum transmit power 162 will cause impermissible interference within the CBRS spectrum band. Put another way, the SAS 210 determines whether or not operation by the UE/CPE 104 on the second uplink channel at the maximum transmit power 162 will interfere with any $1^{st}$ tier incumbent users 10a and/or any $2^{nd}$ tier PAL users 10b. In some examples, SAS 210 determines the UE/CPE 104 causes impermissible interference when the current location 164 of the UE/CPE 104 is within a threshold distance of a restricted area reserved for incumbent users 10a. This disclosure is not limited to any specific techniques, metrics, or parameters used by the SAS 210 for determining interference levels, as well as for determining whether or not interference levels are permissible or impermissible. When the SAS 210 determines that operating the UE/CPE 104 on the secondary CC 120S (second uplink channel) at the maximum transmit power 162 will not cause impermissible interference, the SAS 210 may grant permission for the UE/CPE 104 to operate on the second uplink channel at the maximum transmit power 162 by sending a grant message 170 to the UE/CPE 104 over the primary CC 120P. In some examples, when the UE/CPE 104 receives the grant message 170, the UE/CPE 104 operates on the secondary CC at the maximum transmit power 162 for uplink communications from the current location 164.

On the other hand, when the SAS 210 determines that operating the UE/CPE 104 on the secondary CC 120S (second uplink channel) at the maximum transmit power 162 will cause impermissible interference, the SAS 210 may deny the UE/CPE 104 permission to operate on the secondary CC 120S at the maximum transmit power 162 by sending a denial message 180 to the UE/CPE 104 over the primary CC 120P. In some examples, when the UE/CPE 104 receives the denial message 180, the UE/CPE 104 operates on the secondary CC 220S at an allowable transmit power less than or equal to the EUD allowable transmit power limit (e.g., 23 dBm/10 Mhz). In other examples, the UE/CPE 104 may transmit a subsequent grant request message 160 over the primary CC 120P that requests permission to operate on the secondary CC 120S at a reduced transmit power that is less than the maximum transmit power 162 but exceeding the EUD allowable transmit power limit. Additionally or alternatively, the subsequent grant request message 160 may further request permission to operate on a different secondary CC 120S associated with another frequency.

FIG. 3 provides an example CBRS log 300 that may be stored in the memory hardware 214. The SAS 210 may maintain multiple CBRS logs 300 each associated with a corresponding frequency range 310 (e.g., 10 MHz channel) within the CBRS band or a single CBRS log 300 may encompass all frequencies within the CBRS band. In the example shown, the CBRS log 300 is associated within a corresponding frequency range 310 of 3570 MHz-3580 MHz within the CBRS spectrum and includes a list of device identifiers 306 each identifying corresponding incumbent transmission equipment 106 registered with the SAS 210 and operating within the frequency range 310. The CBRS log 300 further includes a tier status 320, a location 330, transmit power 340, and one or more antenna parameters 350 associated with the corresponding incumbent transmission equipment. The tier status 320 indicates whether the incumbent transmission equipment 106 corresponds to $1^{st}$ Tier incumbent users 10a or $2^{nd}$ tier PAL users 10b. The CBRS log 300 may further include $3^{rd}$ tier GAA users 10c having an active grant for access within the corresponding frequency range 310. The location 330 may include global positioning system (GPS) coordinates, e.g., longitude and latitude, of the corresponding incumbent transmission equipment 106. The transmit power (Tx Power) may be expressed in dBm or expressed as an effective isotropic radiated power (EIRP) value in dBm/10 Mhz. The antenna parameters 350 may include, without limitations, one or more of an antenna orientation 350a, an antenna tilt 350b (in degrees), or antenna height 350c (in meters (m)). The $2^{nd}$ tier and $3^{rd}$ tier (when recorded) users 10b, 10c may directly provide their corresponding device ID 306, tier status 320, location 330, Tx Power 340, and antenna parameters 350 when registering with the SAS 210 and the SAS 210 may record the information in the CBRS log 300 stored in the memory hardware 214. The $1^{st}$ tier users may not provide their operational information directly to the SAS 210, but the SAS 210 may obtain this information using other techniques. For instance, the SAS 210 may communicate with Environmental Sensing Capability (ESC) systems implemented by the FCC in order to detect operation of the $1^{st}$ tier incumbents 10a.

In some examples, SAS 210 determines a corresponding coverage area 124 for each incumbent transmission equipment 106 based on the corresponding tier status 320, location 330, Tx Power 340, and antenna parameters 350 recorded in the CBRS log 300. Accordingly, the CBRS log 300 (e.g., SAS data source) includes a mapping of incumbent transmission equipment 106 registered with the SAS 210 to corresponding coverage areas 124. In some implementations, the SAS 210 determines whether operating the UE/CPE 104 on the secondary CC 120S (second uplink channel) will cause impermissible interference within the CBRS band by querying the CBRS log 300 (e.g., SAS data source) to identify incumbent transmission equipment 106 operating within frequencies that include the secondary CC 120S, and for each identified incumbent transmission equipment 106, estimating an interference level within the corresponding coverage area based on operation of the UE/CPE 104 on the secondary CC 120S at the corresponding maximum transmit power 162 from the current location 164. In these implementations, when the estimated interference level within at least one of the coverage areas 124 satisfies an interference threshold, the SAS 210 determines operation of the UE/CPE 104 on the secondary CC 120S at the maximum transmit power 162 causes impermissible interference. Different coverage areas 124 may define different interference thresholds. For instance, coverage areas 124 of incumbent users 10a may entirely restrict all interference, or permit a lower level of interference compared to coverage areas 124 associated with PAL users 10b. This disclosure is not limited to any technique, metric, or parameters for determining whether not an interference level is impermissible.

FIGS. 4A-4C and 5A-5D provide an example network environment 400 showing a UE device 104 using a first uplink channel (e.g., primary CC 120P) to apply for a SAS grant 170 to operate on a second uplink channel (e.g., secondary CC 120S). The primary CC 120P is established between the UE device 104 and a serving base station 102 (e.g., eNB). The eNB 102 and the UE device 104 each include a corresponding control-plane protocol stack including a radio resource control (RRC) layer, a radio link control (RLC) sub-layer, a Medium Access Control (MAC) layer, and a physical (PHY) layer for transferring signaling and data between the eNB 102 and the UE device 104. A transport channel transfers signaling and data between MAC layers and the PHY layer is mapped to a transport channel. The PHY layer may use a plurality of carriers.

Figure 4A:
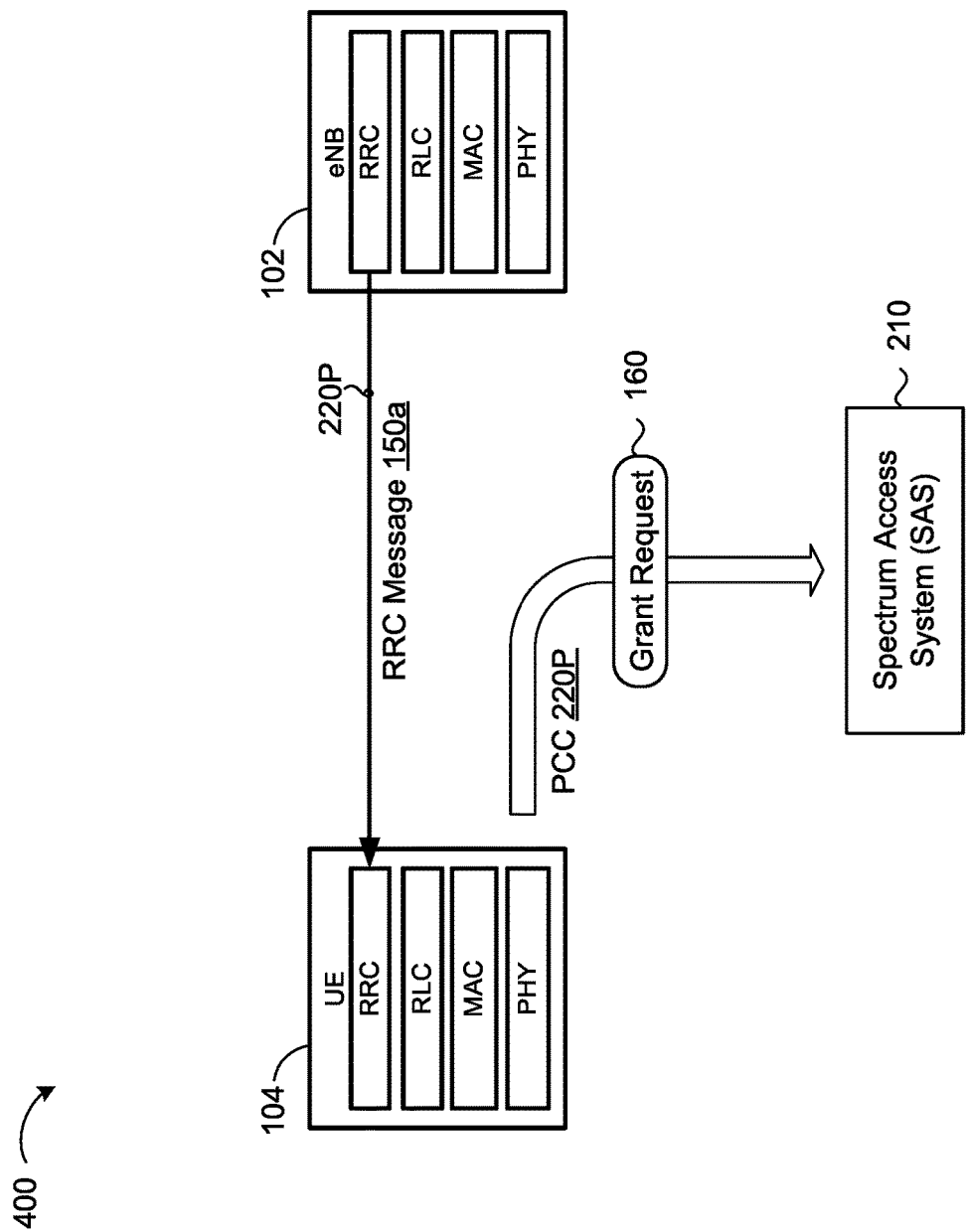
FIGS. 4A-4C are schematic views of an example network environment showing a user equipment (UE) device using a primary component carrier (CC) to apply for a grant for uplink carrier aggregation of a secondary CC when UE device receives a configuration message from a serving base station that commands the UE device to add the secondary CC.

Referring to FIG. 4A, the eNB 102 sends an RRC message 150a to the UE device 104 instructing the UE device to add the second uplink channel (e.g., secondary CC 120S). In response to receiving the RRC message 150a, the UE device 104 transmits a grant request message 160 over the first uplink channel (e.g., primary CC 120P) to the SAS 210. Here, the first uplink channel serves as an anchor point. The grant request message 160 requests permission from the SAS 210 for the UE device 104 to operate on the second uplink channel (e.g., secondary CC 120S) at a maximum transmit power 162 from a current location 164.

Figure 4B:
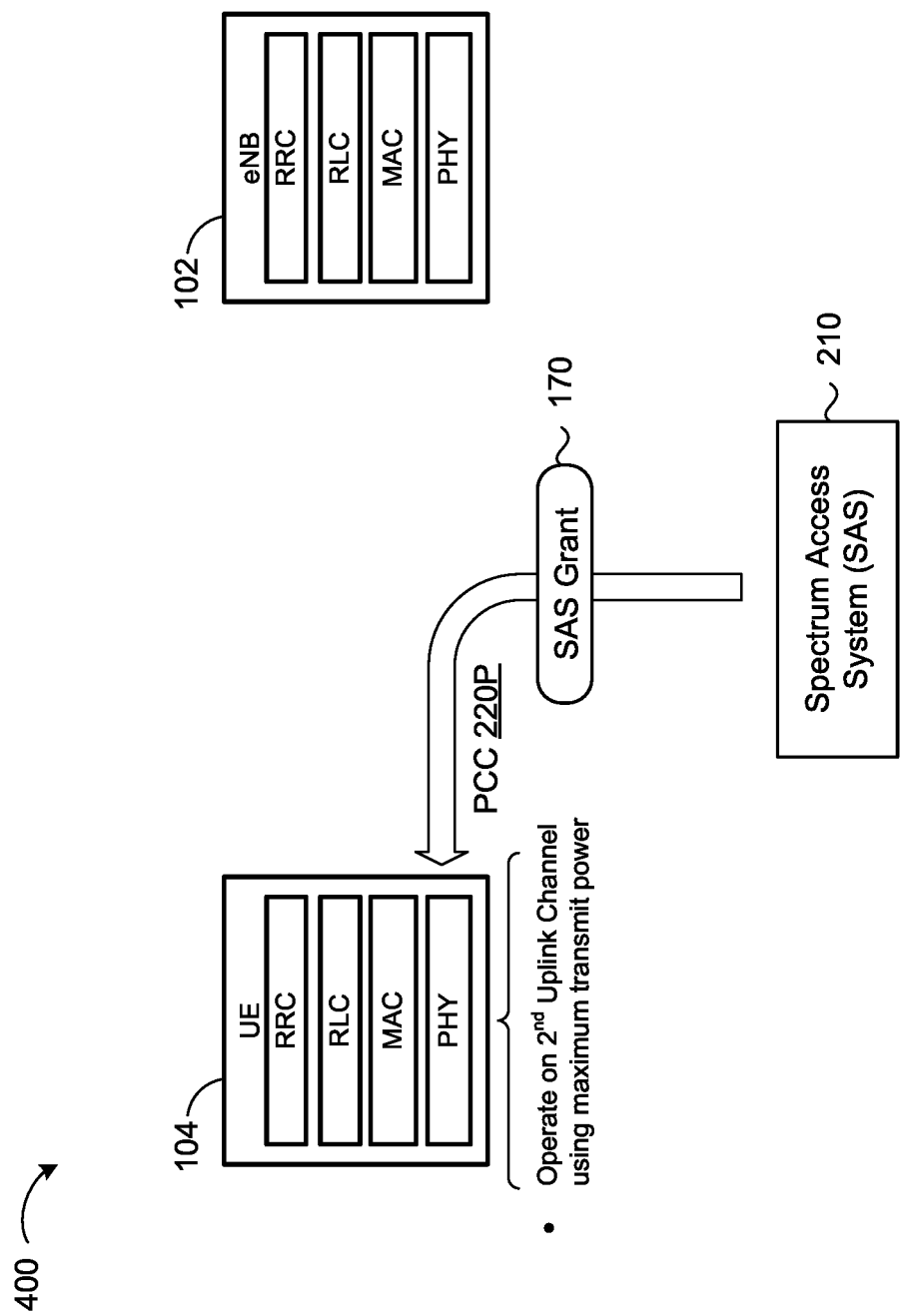

FIG. 4B shows the SAS 210 transmitting a SAS grant 170 to the UE device 104 granting permission for the UE device 104 to operate on the second uplink channel (e.g., secondary CC 120S) at a maximum transmit power 162 from a current location 164. Here, the SAS 210 determines that operation by the UE device 104 on the second uplink channel at the maximum transmit power 162 from the current location 164 will not cause impermissible interference within the CBRS band.

Figure 4C:
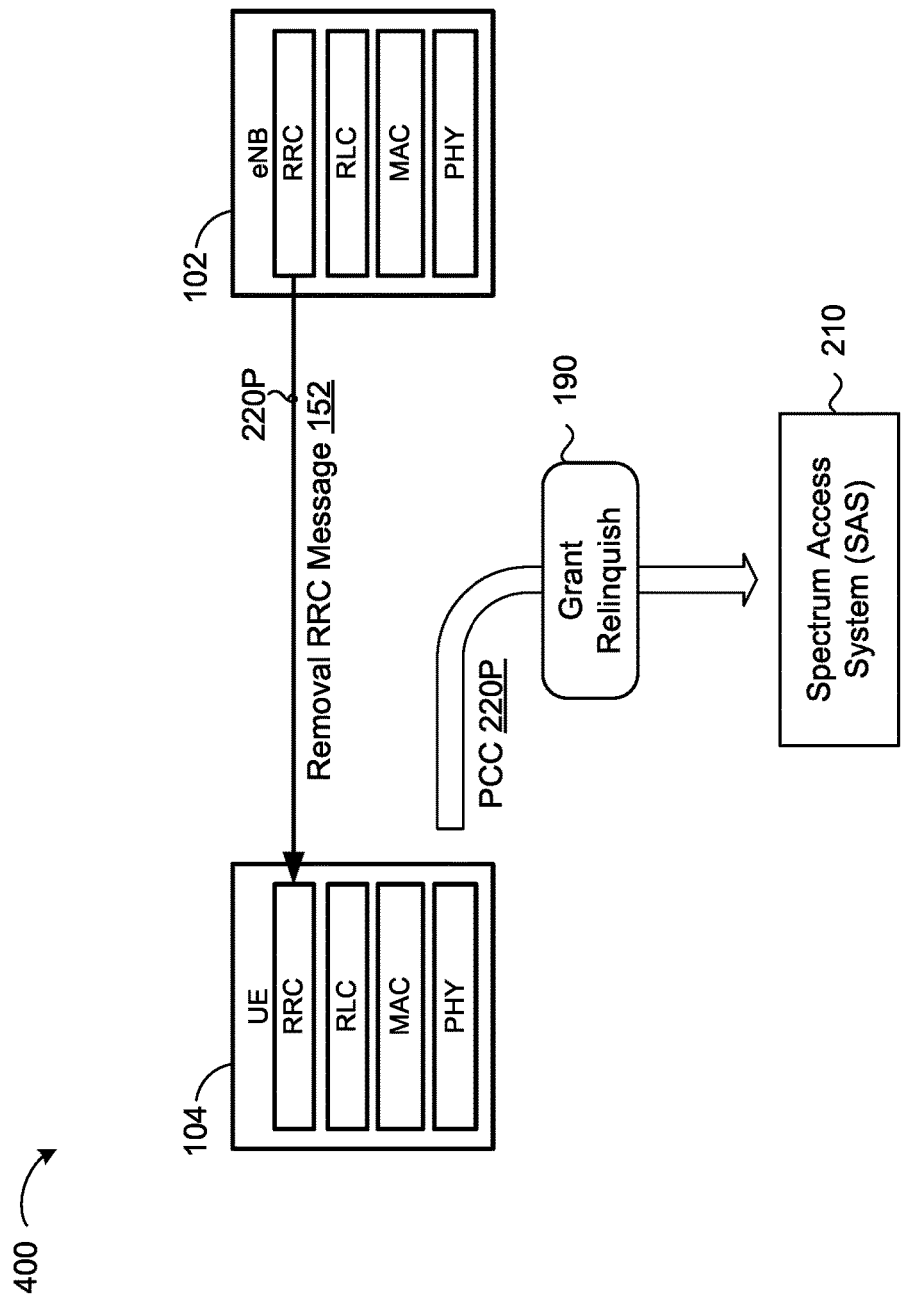

FIG. 4C shows the eNB 102 sending a removal RRC message 152 to the UE device 104 instructing the UE device 104 to remove the second uplink channel (e.g., secondary CC 120S). In response to receiving the removal RRC message 152, the UE device 104 transmits a grant relinquish message 190 over the first uplink channel (e.g., primary CC 120P) to the SAS 210. The grant relinquish message 190 requests removal of the grant for permission to operate on the second uplink channel (e.g., secondary CC 120S). Accordingly, the SAS 210 may remove the grant (e.g., removal from the CBRS log 300) allowing access to the second uplink channel by the UE device 104 at the maximum transmit power 162.

Figure 5A:
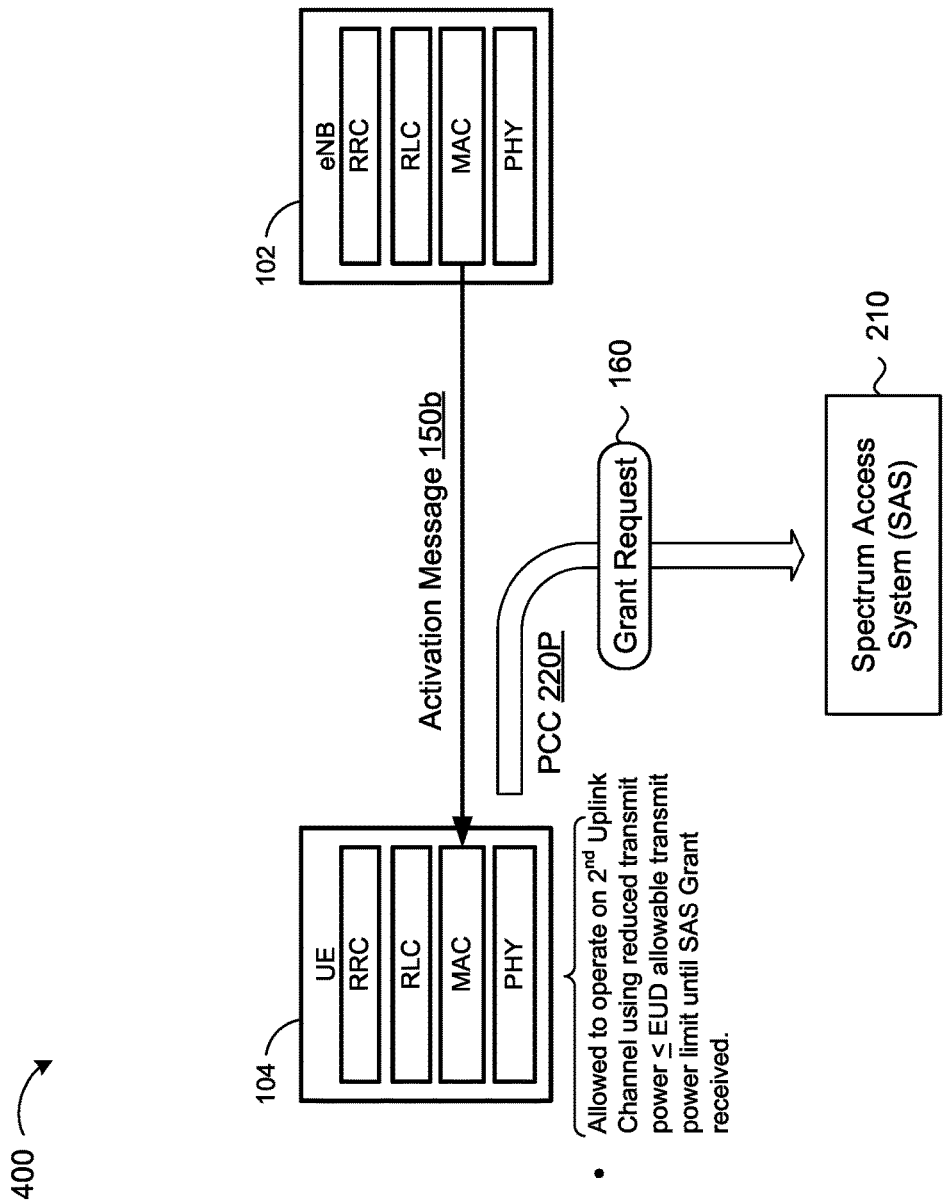

While FIG. 4A shows the UE device 104 sending the grant request message 160 responsive to receiving the RRC message 150a, FIG. 5A shows the eNB 102 sending an activation message 150b via MAC control elements to the UE device 104. The activation message 150b instructs the UE device 104 to activate the second uplink channel (e.g., secondary CC 120S). In response to receiving the activation message 150b, the UE device 104 transmits the grant request message 160 over the first uplink channel (e.g., primary CC 120P) to the SAS 210. Here, the first uplink channel serves as the anchor point. The UE device 104 may begin to operate on the second uplink channel at a transmit power (e.g., allowable transmit power) less than or equal to the EUD allowable transmit power limit (e.g., 23 dBm/10 MHz) until the SAS 210 authorizes the grant to operate at the higher maximum transmit power.

FIG. 5B shows the SAS 210 transmitting a SAS grant 170 to the UE device 104 granting permission for the UE device 104 to operate on the second uplink channel (e.g., secondary CC 120S) at a maximum transmit power 162 from a current location 164. Here, the SAS 210 determines that operation by the UE device 104 on the second uplink channel at the maximum transmit power 162 from the current location 164 will not cause impermissible interference within the CBRS band.

Figure 5C:
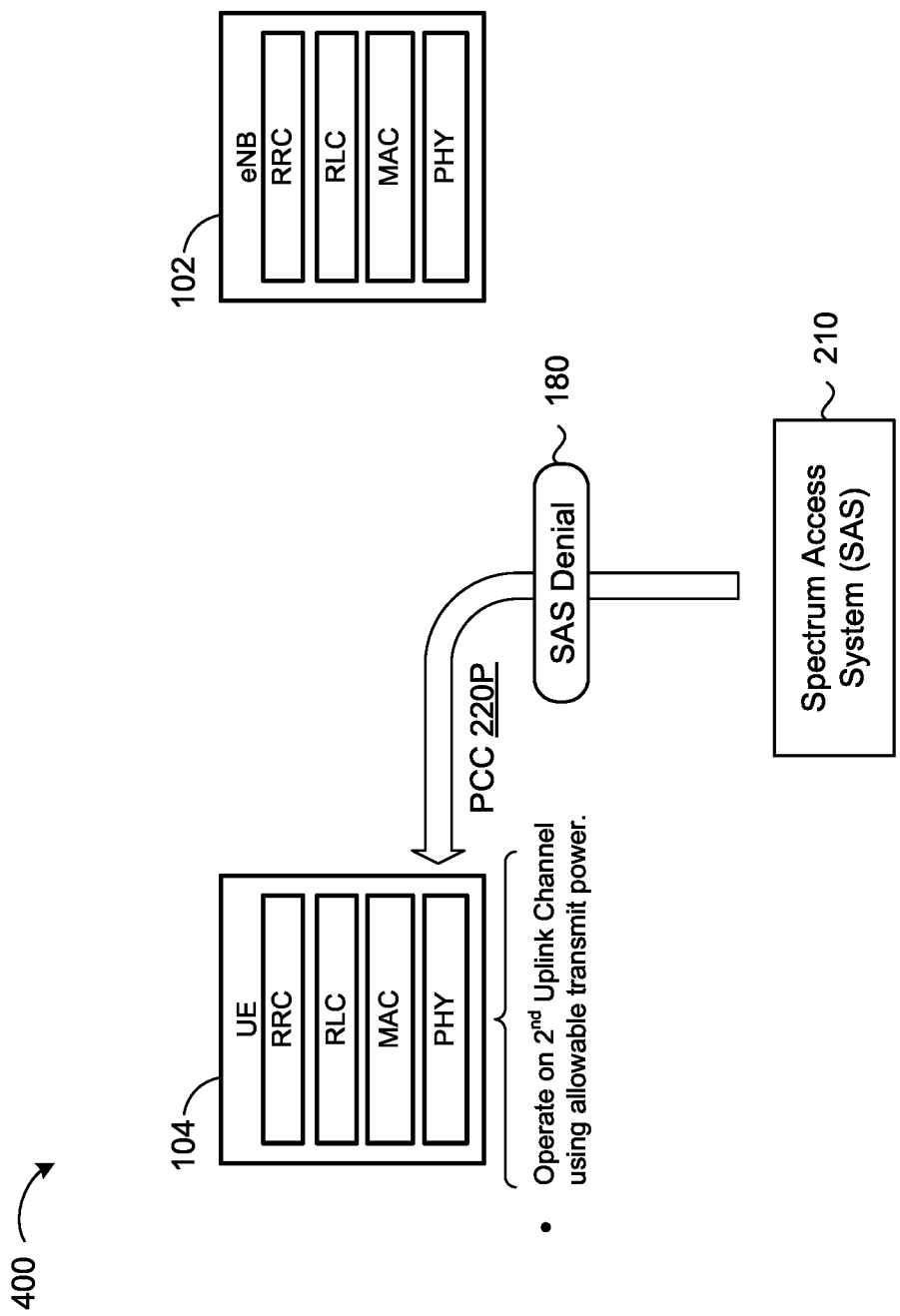

On the other hand, FIG. 5C shows the SAS 210 transmitting a SAS denial 180 to the UE device 104 denying permission for the UE device 104 to operate on the second uplink channel (e.g., secondary CC 120S). In this scenario, the SAS 210 determines that operation by the UE device 104 on the second uplink channel at the maximum transmit power 162 from the current location 164 will cause impermissible interference within the CBRS band. Accordingly, the UE device 104 may still operate on the second uplink channel but at the allowable transmit power that is less than or equal to the EUD allowable transmit power limit (e.g., 23 dBm/10 MHz) until the SAS 210 authorizes the grant to operate at the higher maximum transmit power. The UE device 104 could apply for another grant to operate on a different uplink channel and/or at a reduced transmit power that is less than the maximum transmit power but still greater than the EUD allowable transmit power limit (e.g., 23 dBm/10 MHz).

Figure 5D:
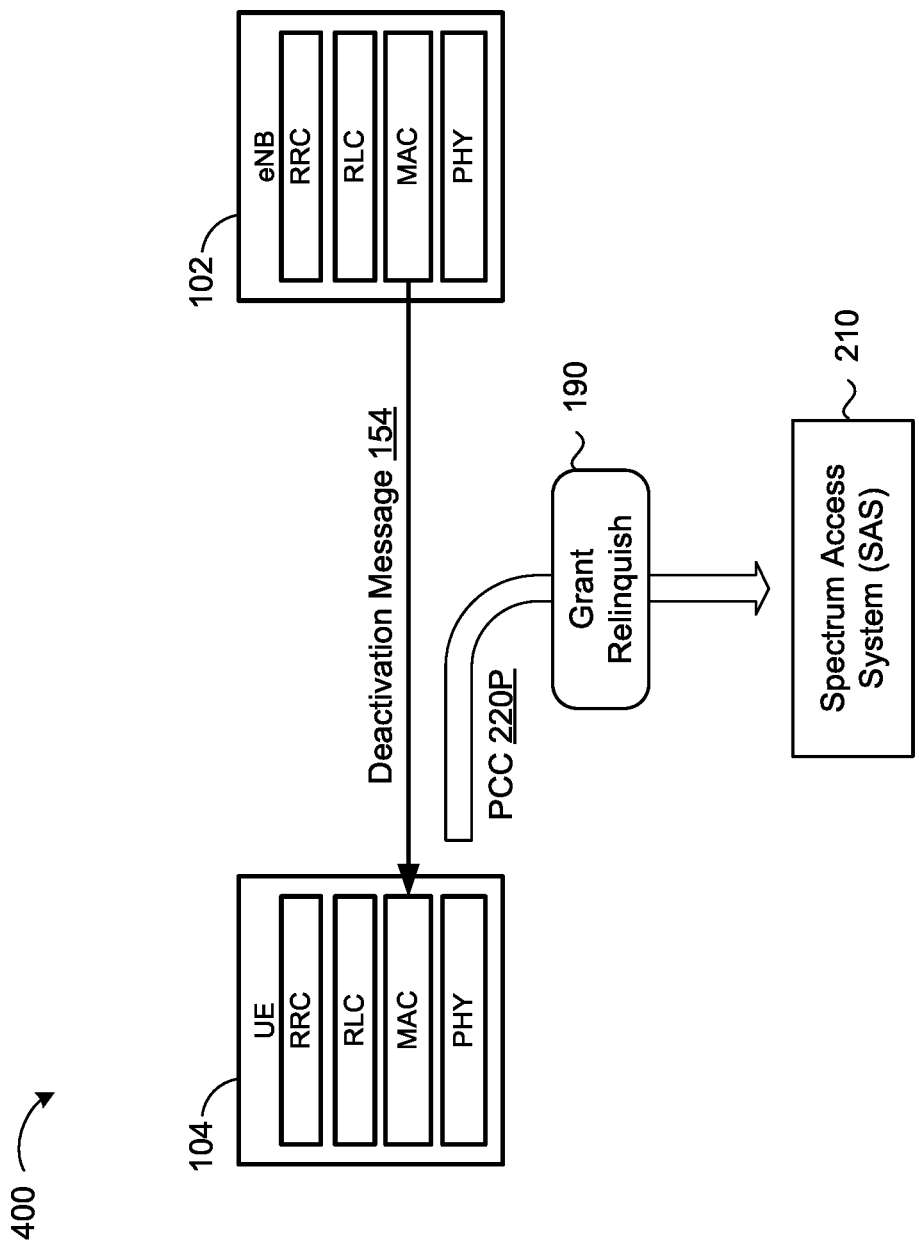

FIG. 5D shows the eNB 102 sending a deactivation message 154 to the UE device 104 via MAC control elements instructing the UE device 104 to deactivate the second uplink channel (e.g., secondary CC 120S). In response to receiving the deactivation message 154, the UE device 104 transmits the grant relinquish message 190 over the first uplink channel (e.g., primary CC 120P) to the SAS 210. The grant relinquish message 190 requests removal of the grant for permission to operate on the second uplink channel (e.g., secondary CC 120S). Accordingly, the SAS 210 may remove the grant (e.g., removal from the CBRS log 300) allowing access to the second uplink channel by the UE device 104 at the maximum transmit power 162. The UE device 104 will only send the grant relinquish message 190 if the SAS grant 170 occurs in FIG. 5B.

Figure 6:
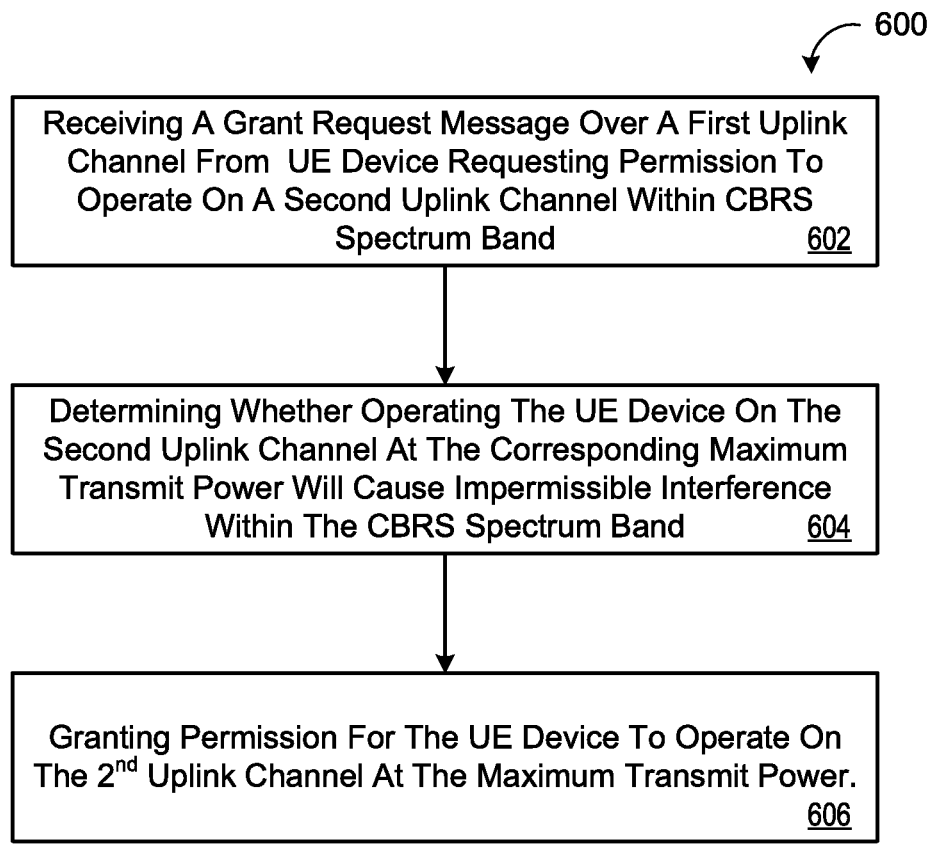
FIG. 6 is a schematic view of an example arrangement of operations for granting permission to a UE device for uplink carrier aggregation in response to receiving a grant request message from the UE device over a first uplink channel.

FIG. 6 provides an example arrangement of operations for a method 600 of granting permission by a spectrum access system (SAS) for a user equipment (UE) device to operate on a second uplink channel 220S when a grant request message 160 is received from the UE device 104 over a first uplink channel 220P. At block 602, the method 600 includes receiving, at data processing hardware 212 of the SAS 210, the grant request message 160 over the first uplink channel 220P from the UE device 104 requesting permission to operate on the second uplink channel 220S within a Citizens Broadband Radio Services (CBRS) spectrum band 12. The UE device 104 may include customer premises equipment (CPE) devices, such as CPE devices mounted on rooftops to provide broadband service to a specified area. The grant request message 160 includes a maximum transmit power 162 of the UE device 104 and a current location of the UE device 104. The UE device 104 supports carrier aggregation of the first uplink channel 220P and the second uplink channel 220S and the maximum transmit power 162 exceeds end user device (EUD) allowable transmit power limits (e.g., 23 dBm/10 MHz) enforced by the SAS 210, thereby requiring the UE device 104 to apply for the grant to operate on the second uplink channel 220S.

The first uplink channel 220P may correspond to primary component carrier (CC) 220P and the second uplink channel 220S may correspond to a secondary CC 220S. For instance, the primary CC 220P may be established between the UE device 104 and a serving base station 102 (e.g., eNB) and may operate in a frequency band/channel either within the unlicensed CBRS band 12 or within some other licensed/unlicensed spectrum band. The UE device 104 may transmit the grant request message 160 over the first uplink channel 220P in response to receiving a configuration message 150 from the eNB 102 commanding the UE device 104 to add or activate the second uplink channel 220S. For instance, the configuration message 150 may include an RRC message 150a instructing the UE device 104 to add the second uplink channel 220S or an activation message 150b sent via medium access control (MAC) elements instructing the UE device 104 to activate the second uplink channel 220S.

At block 604, the method 600 includes determining, by the data processing hardware 212, whether operating the UE device 104 on the second uplink channel 220S at the corresponding maximum transmit power 162 will cause impermissible interference within the CBRS spectrum band 12. For instance, the data processing hardware 212 may query a SAS data source 300 (e.g., CBRS log) stored in memory hardware 214 to determine whether granting the request will cause impermissible interference with any incumbent transmission equipment 106 operating within frequencies that include the second uplink channel 220S. When the data processing hardware 212 determines that the granting the request will cause impermissible interference, the data processing hardware 212 may send a grant denial message 180 denying permission for the UE device 104 to operate on the second uplink channel 220S at the maximum transmit power 162 from the current location 164. In this scenario, the UE device 104 can either operate on the second uplink channel 220S using an allowable transmit power that does not exceed the EUD allowable power limit or may apply for a new grant for operation on a different uplink channel, associated with a different frequency, and/or at a reduced transmit power that is less than the maximum transmit power 162 but still higher than the EUD allowable power limit.

At block 606, when operating the UE device 104 on the second uplink channel 220S at the maximum transmit power 162 will not cause impermissible interference, the method 600 includes granting, by the data processing hardware 212, permission for the UE device 104 to operate on the second uplink channel 220S at the corresponding maximum transmit power 162. For instance, the data processing hardware 212 may send a SAS grant 170 to UE device 104. When aggregation of the second uplink channel 220S is no longer required, the data processing hardware 212 may receive a grant relinquish message 190 over the first uplink channel 220P from the UE device 104. The message 190 requests removal of the grant for permission to operate on the second uplink channel 220S. The UE device 104 may send the grant relinquish message 190 in response to: receiving an RRC message 152 (FIG. 4C) from the eNB 102 that instructs the UE device 104 to remove the second uplink channel 220S; or receiving a deactivation message 154 (FIG. 5D) from the eNB 102 that instructs the UE device 104 to deactivate the second uplink channel 220S.

Figure 7:
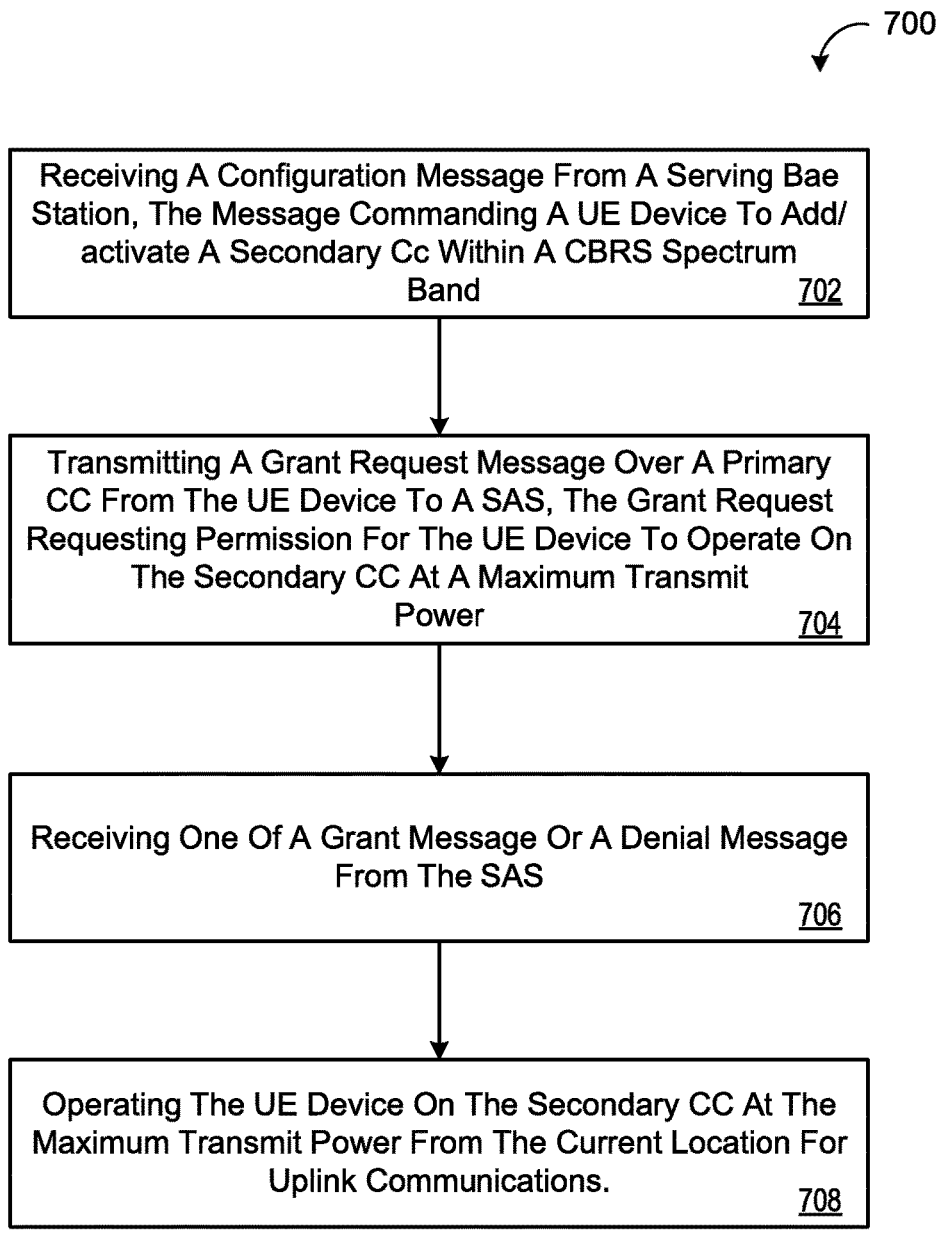
FIG. 7 is a schematic view of an example arrangement of operations for transmitting a grant request message from a UE device over a primary CC to a SAS for permission to operate on a secondary CC.

FIG. 7 provides an example arrangement of operations for a method 700 of using a primary component carrier (CC) 220P to apply for a grant from a spectrum access system (SAS) 210 for permission to operate on a secondary CC 220S. The UE device 104 may include customer premises equipment (CPE) devices, such as CPE devices mounted on rooftops to provide broadband service to a specified area. The UE device 104 supports carrier aggregation of the primary CC 220P and the secondary CC 220S for uplink communications. At block 702, the method 700 includes receiving, at data processing hardware 105 of the UE device 104, a configuration message 150 from a serving base station 102 (e.g., eNB). The configuration message 150 commands the UE device 104 to add or activate the secondary CC 220S within a Citizens Broadband Radio Services (CBRS) spectrum band. The UE device 104 includes a maximum transmit power 162 that exceeds an end user device (EUD) allowable transmit power limit (e.g., 23 dBm/10 MHz) enforced by the SAS 210. Accordingly, the UE device 104 is required by the SAS 210 to apply for a grant to operate on the secondary CC 220S at the maximum transmit power 162. Receiving the configuration message 150 includes one of: receiving a radio resource control (RRC) message 150a instructing the UE device 104 to add the secondary CC 220S; or receiving an activation message 150b sent via medium access control (MAC) elements instructing the UE device 104 to activate the secondary CC 220S At block 704, in response to receiving the configuration message 150, the method 700 includes transmitting a grant request message 160 over the primary CC from the UE device 104 to the SAS 210. The grant request message 160 requests permission from the SAS 210 for the UE device 104 to operate on the secondary CC 220S at the maximum transmit power 162 from a current location 164. At block 706, the method 700 includes the data processing hardware 105 receiving one of a grant message 170 or a denial message 180 from the SAS 210. The grant message 170 (SAS grant) grants the UE device 104 permission to operate on the secondary CC at the maximum transmit power 162, while the denial message denies the UE device 104 permission to operate on the secondary CC 220S at the maximum transmit power 162. Here, the SAS 210 sends the grant message 170 when the SAS 210 determines that operation on the secondary CC 220S will not cause impermissible interference within the CBRS band (i.e., will not cause impermissible interference with incumbent transmission equipment). On the other hand, the SAS 210 sends the denial message 180 when the SAS 210 determines that operation on the secondary CC 220S will cause impermissible interference within the CBRS band.

At block 706, when the grant message 170 is received, the method 700 includes operating, by the data processing hardware 105, the UE device 104 on the secondary CC 220S at the maximum transmit power 162 for uplink communications. However, when the denial message 180 is received, the UE device 104 can either operate on the secondary CC 220S using an allowable transmit power that does not exceed the EUD allowable power limit or may apply for a new grant for operation on a different secondary CC 220S and/or at a reduced transmit power that is less than the maximum transmit power 162 but still higher than the EUD allowable power limit.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 8:
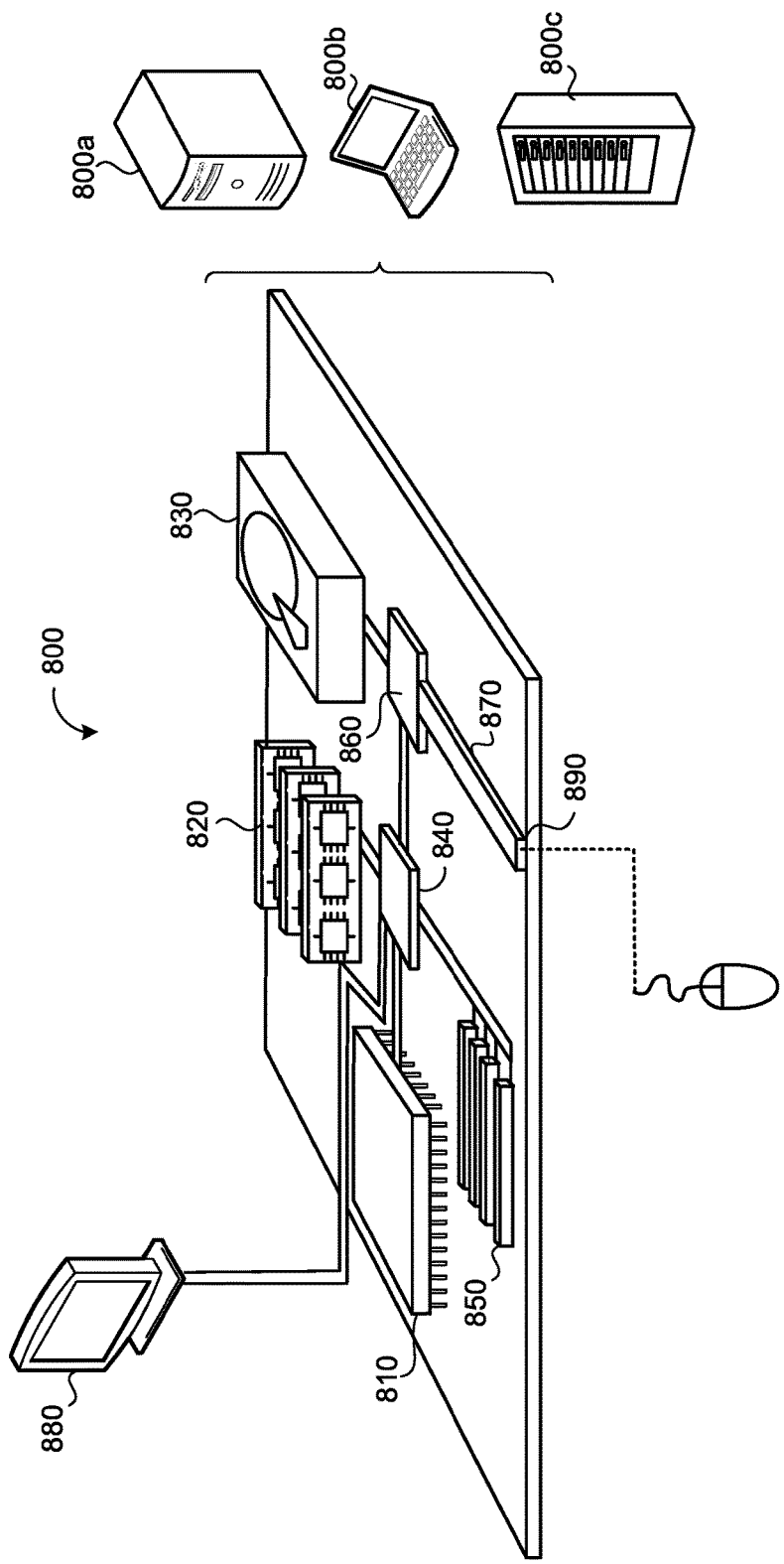
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/ controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 (e.g., data processing hardware 105 of UE/CPE device 104 and data processing hardware 212 of SAS 210) can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 (e.g., memory hardware 107 of UE/CPE device 104 and memory hardware 214 of SAS 210) may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at data processing hardware of a spectrum access system (SAS) over a first uplink channel from a user equipment (UE) device while operating on a second uplink channel within a Citizens Broadband Radio Services (CBRS) spectrum band at a transmit power less than or equal to an end user device (EUD) allowable transmit power limit enforced by the SAS, a grant request message requesting permission to operate on the second uplink channel at a maximum transmit power of the UE device that exceeds the EUD allowable transmit power limit, the grant request comprising a current location and the maximum transmit power of the UE device, the UE device supporting carrier aggregation of the first uplink channel and the second uplink channel;
    determining, by the data processing hardware, whether operating the UE device on the second uplink channel at the corresponding maximum transmit power will cause impermissible interference within the CBRS spectrum band; and
    when operating the UE device on the second uplink channel at the maximum transmit power will not cause impermissible interference, granting, by the data processing hardware, permission for the UE device to operate on the second uplink channel at the corresponding maximum transmit power.

2. The method of claim 1, wherein the UE device is configured to transmit the grant request message over the first uplink channel in response to receiving a radio resource control message from a serving base station, the radio resource control message instructing the UE device to add the second uplink channel.

3. The method of claim 1, wherein the UE device is configured to transmit the grant request message over the first uplink channel in response to receiving an activation message from a serving base station via medium access control (MAC) elements, the activation message instructing the UE device to activate the second uplink channel.

4. The method of claim 1, further comprising receiving, at the data processing hardware, a grant relinquish message over the first uplink channel from the UE device, the grant relinquish message requesting removal of the grant for permission to operate on the second uplink channel at the maximum transmit power of the UE device.

5. The method of claim 4, wherein the UE device is configured to transmit the grant relinquish message over the first uplink channel in response to receiving a radio resource control message from a serving base station, the radio resource control message instructing the UE device to remove the second uplink channel.

6. The method of claim 4, wherein the UE device is configured to transmit the grant relinquish message over the first uplink channel in response to receiving a deactivation message from a serving base station over a media access control (MAC) layer, the deactivation message instructing the UE device to deactivate the second uplink channel.

7. The method of claim 1, wherein determining whether operating the UE device on the second uplink channel will cause impermissible interference within the CBRS spectrum band comprises:
    querying a SAS data source to identify incumbent transmission equipment registered with the SAS for operation within frequencies that include the second uplink channel, the SAS data source comprising a mapping of incumbent transmission equipment registered with the SAS to corresponding coverage areas;
    for each identified incumbent transmission equipment, estimating an interference level within the corresponding coverage area based on operation of the UE device on the second uplink channel at the corresponding maximum transmit power from the current location; and
    when the estimated interference level within at least one of the coverage areas satisfies an interference threshold, determining operation by the UE device on the second uplink channel at the maximum transmit power causes impermissible interference.

8. The method of claim 1, wherein the first uplink channel comprises a primary component carrier and the second uplink channel comprises a secondary component carrier.

9. A spectrum access system comprising:
    data processing hardware; and
    memory hardware in communication with the data processing hardware, the memory hardware storing instructions that when executed on the data processing hardware cause the data processing hardware to perform operations comprising:
        receiving, over a first uplink channel from a user equipment (UE) device while operating on a second uplink channel within a Citizens Broadband Radio Services (CBRS) spectrum band at a transmit power less than or equal to an end user device (EUD) allowable transmit power limit enforced by the spectrum access system, a grant request message requesting permission to operate on the second uplink channel at a maximum transmit power of the UE device that exceeds the EUD allowable transmit power limit, the grant request comprising a current location and the maximum transmit power of the UE device, the UE device supporting carrier aggregation of the first uplink channel and the second uplink channel;
        determining whether operating the UE device on the second uplink channel at the corresponding maximum transmit power will cause impermissible interference within the CBRS spectrum band; and
        when operating the UE device on the second uplink channel at the maximum transmit power will not cause impermissible interference, granting, by the data processing hardware, permission for the UE device to operate on the second uplink channel at the corresponding maximum transmit power.

10. The spectrum access system of claim 9, wherein the UE device is configured to transmit the grant request message over the first uplink channel in response to receiving a radio resource control message from a serving base station, the radio resource control message instructing the UE device to add the second uplink channel.

11. The spectrum access system of claim 9, wherein the UE device is configured to transmit the grant request message over the first uplink channel in response to receiving an activation message from a serving base station via medium access control (MAC) elements, the activation message instructing the UE device to activate the second uplink channel.

12. The spectrum access system of claim 9, wherein the operations further comprise receiving a grant relinquish message over the first uplink channel from the UE device, the grant relinquish message requesting removal of the grant for permission to operate on the second uplink channel at the maximum transmit power of the UE device.

13. The spectrum access system of claim 12, wherein the UE device is configured to transmit the grant relinquish message over the first uplink channel in response to receiving a radio resource control message from a serving base station, the radio resource control message instructing the UE device to remove the second uplink channel.

14. The spectrum access system of claim 12, wherein the UE device is configured to transmit the grant relinquish message over the first uplink channel in response to receiving a deactivation message from a serving base station over a media access control (MAC) layer, the deactivation message instructing the UE device to deactivate the second uplink channel.

15. The spectrum access system of claim 9, wherein determining whether operating the UE device on the second uplink channel will cause impermissible interference within the CBRS spectrum band comprises:
  querying a spectrum access system (SAS) data source to identify incumbent transmission equipment registered with the SAS for operation within frequencies that include the second uplink channel, the SAS data source comprising a mapping of incumbent transmission equipment registered with the SAS to corresponding coverage areas;
  for each identified incumbent transmission equipment, estimating an interference level within the corresponding coverage area based on operation of the UE device on the second uplink channel at the corresponding maximum transmit power from the current location; and
  when the estimated interference level within at least one of the coverage areas satisfies an interference threshold, determining operation by the UE device on the second uplink channel at the maximum transmit power causes impermissible interference.

16. The spectrum access system of claim 9, wherein the first uplink channel comprises a primary component carrier and the second uplink channel comprises a secondary component carrier.

17. A method for granting a request for uplink carrier aggregation, the method comprising:
  receiving, at data processing hardware of a user equipment (UE) device, a configuration message from a serving base station, the configuration message commanding the UE device to add or activate a secondary CC within a Citizens Broadband Radio Services (CBRS) spectrum band, the UE device supporting carrier aggregation of the primary CC and the secondary CC for uplink communications;
  in response to receiving the configuration message:
    operating, by the data processing hardware, the UE device on the secondary CC at an allowable transmit power less than or equal to an end user device (EUD) allowable transmit power limit enforced by a spectrum access system (SAS); and
    transmitting a grant request message over a primary CC from the UE device to the SAS, the grant request message requesting permission from the SAS for the UE device to operate on the secondary CC at a maximum transmit power of the UE device from a current location, the maximum transmit power of the UE device exceeding the EUD allowable transmit power limit;
  receiving, at the data processing hardware, one of a grant message or denial message from the SAS, the grant message granting the UE device permission to operate on the secondary CC at the maximum transmit power and the denial message denying the UE permission to operate on the secondary CC at the maximum transmit power; and
  when the grant message is received, operating, by the data processing hardware, the UE device on the secondary CC at the maximum transmit power for uplink communications.

18. The method of claim 17, wherein receiving the configuration message from the serving base station comprises one of:
  receiving a radio resource control message commanding the UE device to add the secondary CC for uplink communications; or
  receiving an activation message via medium access control (MAC) elements, the activation message commanding the UE device to activate the secondary CC for uplink communications.

19. The method of claim 17, wherein the SAS is configured to, in response to receiving the grant request message:
  determine whether operating the UE device on the secondary CC at the maximum transmit power from the current location will cause impermissible interference within the CBRS spectrum band, and one of:
  transmit the grant message when operating the UE device on the secondary CC at the maximum transmit power from the current location will not cause impermissible interference; or
  transmit the denial message when operating the UE device on the secondary CC at the maximum transmit power from the current location will cause impermissible interference.

20. The method of claim 19, wherein the SAS determines whether operating the UE device on the secondary CC at the maximum transmit power from the current location will cause impermissible interference within the CBRS spectrum band by:
  querying a SAS data source stored in the memory hardware to identify incumbent transmission equipment registered with the SAS for operation within frequencies that include the secondary CC, the SAS data source comprising a mapping of incumbent transmission equipment registered with the SAS to corresponding coverage areas;
  for each identified incumbent transmission equipment, estimating an interference level within the corresponding coverage area based on operation of the UE device on the secondary CC at the maximum transmit power from the current location; and when the estimated interference level within at least one of the coverage areas satisfies an interference threshold, determining operation by the UE device on the secondary CC at the maximum transmit power from the current location causes impermissible interference.

21. The method of claim 17, further comprising, when the denial message is received from the SAS, transmitting a subsequent grant request message over the primary CC from the UE device to the SAS, the subsequent grant request message requesting permission from the SAS for the UE device to operate on the secondary CC at a reduced transmit power from the current location, the reduced transmit power less than the maximum transmit power and comprising an effective isotropic radiated power (EIRP) value greater than the EUD allowable transmit power limit.

22. The method of claim 17, further comprising, when the denial message is received from the SAS, maintaining, by the data processing hardware, operation of the UE device on the secondary CC at the allowable transmit power less than or equal to the EUD allowable transmit power limit, the EUD allowable transmit power not requiring a grant from the SAS for uplink communications over the secondary CC.

23. A user equipment (UE) device comprising:
data processing hardware; and
memory hardware in communication with the data processing hardware, the memory hardware storing instructions that when executed on the data processing hardware cause the data processing hardware to perform operations comprising:
  receiving a configuration message over a primary component carrier (CC) from a serving base station, the configuration message commanding the UE device to add or activate a secondary CC within a Citizens Broadband Radio Services (CBRS) spectrum band, the UE device supporting carrier aggregation of the primary CC and the secondary CC for uplink communications;
  in response to receiving the configuration message:
    operating the UE device on the secondary CC at an allowable transmit power less than or equal to an end user device (EUD) allowable transmit power limit enforced by a spectrum access system (SAS); and
    transmitting a grant request message over the primary CC from the UE device to the SAS, the grant request message requesting permission from the SAS for the UE device to operate on the secondary CC at a maximum transmit power from a current location, the maximum transmit power of the UE device exceeding the EUD allowable transmit power limit;
  receiving one of a grant message or denial message from the SAS, the grant message granting the UE permission to operate on the secondary CC at the maximum transmit power from the current location and the denial message denying the UE permission to operate on the secondary CC at the maximum transmit power from the current location; and
  when the grant message is received, operating the UE device on the secondary CC at the maximum transmit power from the current location for uplink communications.

24. The UE device of claim 23, wherein receiving the configuration message from the serving base station comprises one of:
  receiving a radio resource control message commanding the UE device to add the secondary CC for uplink communications; or
  receiving an activation message via medium access control (MAC) elements, the activation message commanding the UE device to activate the secondary CC for uplink communications.

25. The UE device of claim 23, wherein the SAS is configured to, in response to receiving the grant request message:
  determine whether operating the UE device on the secondary CC at the maximum transmit power from the current location will cause impermissible interference within the CBRS spectrum band, and one of:
  transmit the grant message when operating the UE device on the secondary CC at the maximum transmit power from the current location will not cause impermissible interference; or
  transmit the denial message when operating the UE device on the secondary CC at the maximum transmit power from the current location will cause impermissible interference.

26. The UE device of claim 25, wherein the SAS determines whether operating the UE device on the secondary CC at the maximum transmit power from the current location will cause impermissible interference within the CBRS spectrum band by:
  querying a SAS data source stored in the memory hardware to identify incumbent transmission equipment registered with the SAS for operation within frequencies that include the secondary CC, the SAS data source comprising a mapping of incumbent transmission equipment registered with the SAS to corresponding coverage areas;
  for each identified incumbent transmission equipment, estimating an interference level within the corresponding coverage area based on operation of the UE device on the secondary CC at the maximum transmit power from the current location; and
  when the estimated interference level within at least one of the coverage areas satisfies an interference threshold, determining operation by the UE device on the secondary CC at the maximum transmit power from the current location causes impermissible interference.

27. The UE device of claim 23, wherein the operations further comprise, when the denial message is received from the SAS, transmitting a subsequent grant request message over the primary CC from the UE device to the SAS, the subsequent grant request message requesting permission from the SAS for the UE device to operate on the secondary CC at a reduced transmit power, the reduced transmit power less than the maximum transmit power and comprising an effective isotropic radiated power (EIRP) value greater than the EUD allowable transmit power limit.

28. The UE device of claim 23, wherein the operations further comprise, when the denial message is received from the SAS, maintaining operation of the UE device on the secondary CC at the transmit power less than or equal to the EUD allowable transmit power limit, the EUD allowable transmit power not requiring a grant from the SAS for uplink communications over the secondary CC.

* * * * *